United States Patent
Hiroki et al.

[11] Patent Number: 5,948,343
[45] Date of Patent: Sep. 7, 1999

[54] HOLLOW SHAPED MOLDED ARTICLE, HOLLOW SHAPED MOLDING PROCESS AND HOLLOW SHAPED MOLDING DEVICE

[75] Inventors: Katagiri Hiroki, Yokohama; Watanabe Mituo; Oziro Minoru, both of Oura-gun; Akutu Hidetoshi, Ota; Ono Masaki, Ashikaga; Iida Isao, Ota, all of Japan

[73] Assignee: RP Topla Limited, Osaka, Japan

[21] Appl. No.: 08/727,418

[22] PCT Filed: Feb. 23, 1996

[86] PCT No.: PCT/JP96/00417

§ 371 Date: Dec. 12, 1996

§ 102(e) Date: Dec. 12, 1996

[87] PCT Pub. No.: WO96/26062

PCT Pub. Date: Aug. 29, 1996

[30] Foreign Application Priority Data

Feb. 23, 1995 [JP] Japan ................................. 7-058251
Oct. 31, 1995 [JP] Japan ................................. 7-305183
Jan. 18, 1996 [JP] Japan ................................. 8-023398

[51] Int. Cl.$^6$ .............................. B29C 43/22; B29D 23/00
[52] U.S. Cl. .................. 264/503; 264/512; 264/319; 425/577; 425/579; 425/585; 428/35.7; 428/36.4; 428/36.9; 428/36.91
[58] Field of Search ..................... 428/35.7, 36.9, 428/36.92, 36.91, 36.4; 264/40.3, 40.5, 328.8, 503, 512, 513, 319; 425/522, 524, 542, 577, 579, 585

[56] References Cited

U.S. PATENT DOCUMENTS

| 5,324,558 | 6/1994 | Muto et al. | 428/36.91 |
| 5,330,807 | 7/1994 | Williams | 428/36.91 |
| 5,397,636 | 3/1995 | Miyao et al. | 428/36.9 |
| 5,474,823 | 12/1995 | Kamiyama et al. | 428/36.91 |
| 5,629,062 | 5/1997 | Ejiri et al. | 428/36.9 |
| 5,763,035 | 6/1998 | Andre De La Porte et al. | 428/36.91 |

FOREIGN PATENT DOCUMENTS

| 0061890 | 4/1982 | Japan . |
| 1-145108 | 6/1989 | Japan . |
| 3-121821 | 5/1991 | Japan . |
| 3-138115 | 6/1991 | Japan . |
| 4-208425 | 7/1992 | Japan . |
| 406099552 | 4/1994 | Japan . |

OTHER PUBLICATIONS

International Search Report for International Application No. PCT/JP96/00417 dated May 28, 1996.

*Primary Examiner*—Rena L. Dye
*Attorney, Agent, or Firm*—Armstrong, Westerman, Hattori, McLeland & Naughton

[57] ABSTRACT

The invention relates to a hollow shaped molding process which comprises injecting a molten resin into a main cavity which has an injection port provided with a floating core at its one end and a sub-cavity at the other end through an openable communication port, injecting a compressed fluid from the injection port, moving the floating core toward the communication port, and discharging the resin into the sub-cavity through the communication port, wherein the resin positioned at the center is discharged into the sub-cavity by the moved floating core, and the floating core is moved into the sub-cavity through the communication port.

14 Claims, 15 Drawing Sheets

HOLLOW SHAPED MOLDED ARTICLE, HOLLOW SHAPED MOLDING PROCESS AND HOLLOW SHAPED MOLDING DEVICE

FIELD OF THE INVENTION

The invention relates to hollow shaped molded articles such as pipes, their molding process and their molding device.

BACKGROUND OF THE INVENTION

As a conventional process and device for monolithic molding of a synthetic resin pipe, it is known to use a mold which comprises a metal floating core having a diameter corresponding to an inner diameter of the pipe and an injection port for injecting a compressed fluid, both provided at one end of a main cavity, and a sub-cavity provided at the other end of the main cavity through a communication port; the main cavity is filled with a molten resin, the compressed fluid is introduced under pressure through the injection port, the floating core is moved toward the communication port to form a hollow part in the resin filled within the cavity, and an excess part of the resin is discharged into the sub-cavity through the communication port, thereby monolithically molding a hollow pipe (Japanese Patent Laid-Open Publication No. Hei 4-208425).

The above-described conventional process and device are primarily for injection molding and are particularly characterized by forming the hollow part by effecting the injection of the compressed fluid and the movement of the floating core, and have an advantage of producing a pipe which has a smooth surface condition and high dimensional precision. And, they can also mold a reinforced resin containing reinforced fiber such as glass fiber, carbon fiber or metal fiber. Besides, they have an advantage of producing a curved pipe in addition to a straight pipe when bending is within a range that the floating core can be moved.

And, in the above conventional process and device, the communication port has a diameter smaller than the floating core, and the floating core stays within the main cavity. Thus, since the metallic floating core is designed to stay within the main cavity, it is advantageous that the resin extruded into the sub-cavity can be pulverized after completing the molding process and can immediately be used again as the molding material.

However, the above conventional process and device had the following disadvantages.

(1) Since the floating core remains within the main cavity, a molded article has at least one end of its formed hollow part closed by this floating core. Although this hollow shaped molding process and its molding device are particularly suitable to produce a pipe, the produced pipe has its one end closed by the floating core.

(2) The above closed part is cut off after molding. But, it is a troublesome work, and the metallic floating core remains in the cut-off piece. Therefore, the floating core must be removed before reusing the cut-off piece as the molding material.

(3) The resin discharged into the sub-cavity is removed as a block- or rod-shaped mass and cannot be pulverized easily, detrimental to reuse. Particularly, when a hollow shaped molded article is made of a reinforced resin containing reinforced fiber, the reinforced resin in the sub-cavity has a high strength, so that a large crusher is required to break it, and its blades are easily worn. Thus, the reinforced resin cannot be reused readily. Besides, reuse is also hindered because when the reinforced resin is crushed, its reinforced fiber is cut into pieces, lowering the mechanical properties of the reinforced resin.

(4) When the hollow shaped molded article is made of a reinforced resin, the inner surface of the hollow shaped molded article with which the moving floating core is in direct contact loses its smoothness easily because the reinforced resin contains a filler reinforcing material or reinforcing fiber. Therefore, when the hollow shaped molded article is used as a pipe, for example, there is a disadvantage that a significant property of the pipe, i.e., a flow resistance, is increased, resulting in extremely limiting its application range.

(5) To move the floating core, the compressed fluid at a substantially high pressure is injected in a stroke. Therefore, the floating core is instantaneously moved toward the communication port. As a result, the floating core does not always pass through the center of the main cavity and often passes a deviated route, tending to increase a deviation in wall thickness of the hollow shaped molded article. Particularly, to produce a curved pipe, there is a high tendency for the floating core passes by the inner radius of the curved part, causing a prominent deviation in wall thickness. On the other hand, since the floating core is hardly moved when a compressed fluid is injected slowly under a low pressure, it is quite difficult to control the moving speed of the floating core by the pressure and injecting speed of the compressed fluid.

The present invention has been completed in view of the above conventional disadvantages and aims to achieve the following objects.

Specifically, a first object is to make it possible to produce a molded article with either end of a hollow part open without taking a labor of cutting a closed part after molding.

A second object is to produce a hollow shaped molded article having an inner surface with particularly good smoothness when a reinforced resin is used to produce it.

A third object is to produce a hollow shaped molded article having a quite uniformly distributed wall thickness.

And, a fourth object is to further facilitate the reuse of an excess resin discharged from the main cavity.

To achieve the above objects, means provided by the invention are classified roughly into three.

First, description will be made on a hollow shaped molding process and device according to a first aspect of the invention to achieve the first object.

As shown in FIG. 1, the first aspect of the invention relates to a hollow shaped molding process in that after injecting a molten resin into a main cavity 1 which has an injection port 3 provided with a floating core 2 at its one end and a sub-cavity 6 at the other end through an openable communication port 5, a compressed fluid is introduced under pressure from the injection port 3 to move the floating core 2 toward the communication port 5, and the resin is discharged into the sub-cavity 6 through the communication port 5, wherein the moved floating core 2 discharges the resin positioned along the center of the main cavity 1 into the sub-cavity 6, and the floating core 2 is moved into the sub-cavity 6 through the communication port 5.

It is also shown in FIG. 1 that the invention relates to a hollow shaped molding device in which a main cavity 1 has at its one end a floating core 2 and an injection port 3 for injecting a compressed fluid for moving the floating core 2 to the other end of the main cavity 1, and an openable communication port 5 communicated with a sub-cavity 6 is provided at the other end of the main cavity 1, wherein the communication port 5 has a size enough to allow the floating core 2 to pass through, and the sub-cavity 6 has a volume sufficient with a margin to accommodate the floating core 2 and the resin discharged into the sub-cavity 6 through the communication port 5 when the floating core 2 is moved into the sub-cavity 6 by the compressed fluid introduced under pressure through the injection port 3 with the main cavity 1 filled with the molten resin.

Now, the hollow shaped molding device according to the first aspect of the invention will be described with reference to FIG. 1.

The main cavity 1 has a shape corresponding to the external form of a main molded article 9 (see FIG. 6). The main molded article 9 in this embodiment is a curved pipe.

At one end of the main cavity 1, the floating core 2 having a diameter corresponding to the inner diameter of the main molded article 9 (see FIG. 6) is provided, and the injection port 3 for introducing the compressed fluid under pressure for moving the floating core 2 to the other end of the main cavity 1 is provided.

The floating core 2 is provided within the main cavity 1 with the injection port 3 behind it so as to be pushed by the compressed fluid injected through the injection port 3, and may be made of metal such as brass, stainless steel, iron or aluminum, or a resin if it is not deformed heavily when molding. Particularly, when a resin is used for the floating core 2, it can be made light and easily moved without so highly increasing a pressure of the compressed fluid to be injected through the injection port 3, and the resin injected and contacted to the floating core 2 is not quickly cooled as compared with when the floating core 2 of metal is used, so that it is advantageous that the inner surface condition of the main molded article 9 (see FIG. 6) on the side of the injection port 3 can be improved.

In addition to the ball as illustrated, the floating core 2 may have a shape such as a cone, a shell or a hemisphere as long as its maximum diameter corresponds to the inner diameter of the main molded article 9.

The injection port 3 is connected to a compressed fluid system (not shown) for injecting and discharging the compressed fluid. The injection port 3 serves to apply the compressed fluid supplied from the compressed fluid system, to the back of the floating core 2 and to push the floating core 2 to move to the other end of the main cavity 1. The compressed fluid is introduced under pressure through the injection port 3 after filling the main cavity 1 with the resin, and a gate 4 is provided at a position slightly away from the floating core 2, so that when the molten resin is injected through the gate 4 to fill the main cavity 1 with the molten resin, the floating core 2 is not floated up and it is kept pressed against the injection port 3.

At the other end of the main cavity 1, the communication port 5 is provided, and the sub-cavity 6 is communicated with the main cavity 1 through the communication port 5. The communication port 5 has a size to allow the floating core 2 to pass through it but is slightly constricted.

The sub-cavity 6 has a volume sufficient with a margin to accommodate the floating core 2 and the excess resin discharged from the main cavity 1 when the compressed fluid is introduced under pressure from the injection port 3 to move the floating core 2 with the main cavity 1 filled with the resin.

A movable shaft 7 is inserted through substantially the center of the sub-cavity 6 to make reciprocating motion to and from the communication port 5. The movable shaft 7 is moved forward and forced against the peripheral wall of the communication port 5 with the periphery of its front end to close the communication port 5, and moved backward to open the communication port 5. And, the front end of the movable shaft 7 is designed to receive the floating core 2 which enters the sub-cavity 6 when the compressed fluid is introduced under pressure.

In this embodiment, the communication port 5 is opened or closed by the reciprocating motion of the movable shaft 7, but it is to be understood that another means may be adopted to open and close the communication port 5.

Now, a molding procedure by the hollow shaped molding process according to the first aspect of the invention by using the above-described device will be described with reference to FIG. 2 to FIG. 6.

First, the movable shaft 7 is moved forward to close the communication port 5 (the state shown in FIG. 1), and a molten resin is injected to fill the main cavity 1 with the resin as shown in FIG. 2.

As the resin, a thermoplastic resin which is generally used for injection molding and extrusion molding can be used, and a thermosetting resin can also be used as required. And, such resins may be compounded with various types of fillers, additives or pigments as required.

And, the above resins may contain reinforced fiber such as glass fiber, carbon fiber or metal fiber. But, when a hollow shaped molded article is made of a reinforced resin containing such reinforced fiber, the excess reinforced resin discharged from the main cavity 1 as the floating core 2 moves has such a high strength that its reuse is difficult. Besides, the inner surface of the hollow shaped molded article with which the moving floating core 2 is in direct contact loses its smoothness easily because the reinforced resin contains a filler reinforcing material or reinforced fiber.

The molten resin is injected by an injection machine in the same way as ordinary injection molding. Generally, an injection pressure is about 50 to 200 $kg/cm^2$ though variable depending on the type of used resin, the presence or not of reinforced fiber, and the reinforced fiber contents.

The molten resin is injected with the floating core 2 held at the injection port 3. This can be achieved by forming the gate 4 (see FIG. 1) on the side of the communication port 5 slightly away from the floating core 2.

Then, as shown in FIG. 3, the movable shaft 7 is slightly moved backward to open the communication port 5, and the compressed fluid is introduced under pressure through the injection port 3.

The compressed fluid is a gas or liquid which does not react with or is not compatible with the used resin under the conditions of injection molding temperature and pressure. Specifically, nitrogen gas, carbon dioxide, air, glycerin, liquid paraffin or the like may be used, but inert gas such as nitrogen gas is preferable.

When a gas such as nitrogen gas is used as the compressed fluid, this compressed gas accumulated in an accumulating tank with a pressure increased by a compressor in advance is lead to the injection port 3 through piping, or the compressed gas is directly sent to the injection port 3 and has its pressure sequentially increased by a compressor. In the former case, the pressure of the compressed gas supplied to the injection port 3 is generally about 50 to 300 $kg/m^2$ though variable depending on the type of resin used.

By injecting the compressed fluid, the floating core 2 is moved forward to the sub-cavity 6 while pushing the molten resin, which is slowly cooled at the center in the main cavity 1, into the sub-cavity 6 through the communication port 5 while leaving the resin which has started to cool and cure along the inner wall of the main cavity 1.

When the floating core 2 has passed by, a hollow section 8 having substantially the same diameter as the diameter of the floating core 2 is formed. Therefore, the diameter of the hollow section 8 to be formed can be adjusted by the diameter of the floating core 2 to be selected.

The resin having the hollow section 8 formed is pressed against the inner wall of the main cavity 1 to keep its shape by the pressure of the compressed fluid injected.

As shown in FIG. 4, when the compressed fluid is further injected, the floating core 2 enters the sub-cavity 6, and the sub-cavity 6 is filled with the resin discharged from the communication port 5 and the compressed fluid which has entered the sub-cavity 6 while pushing the floating core 2.

From the state shown in FIG. 4, the movable shaft 7 is further moved backward and stopped moving, then kept with the compressed fluid applied into the hollow section 8 as shown in FIG. 5, so that the resin can be fully pressed against the inner wall of the main cavity 1, thereby enabling to prevent the occurrence of shrinkage due to cooling.

After cooling the resin in the mold, the compressed fluid in the hollow section 8 is discharged, the movable shaft 7 is further moved backward to be separated from the sub-cavity 6, and the molded article is removed from the mold. To discharge the compressed fluid, the injection port 3 can be opened to the atmosphere when gas is used as the compressed fluid, but it is preferably collected into a collection tank (not shown) so as to be reused. The molded article removed is as shown in FIG. 6 and has a main molded article 9 formed by the main cavity 1 and a secondary molded article 10 formed by the sub-cavity 6.

A thin constricted part 11 which is formed by the constricted communication port 5 is between the main molded article 9 and the secondary molded article 10, and the main molded article 9 and the secondary molded article 10 can be separated at this constricted part 11 to attain a desired pipe. As described above, since the floating core 2 is left within the secondary molded article 10, a pipe consisting of the main molded article 9 is originally obtained with its ends open.

Now, the hollow shaped molding process according to a second aspect of the invention to achieve the first and second objects will be described.

As shown in FIG. 1, the second aspect of the invention relates to a hollow shaped molding process in that after injecting a molten resin into a main cavity 1 which has an injection port 3 provided with a floating core 2 at its one end and a sub-cavity 6 at the other end through an openable communication port 5, a compressed fluid is introduced under pressure from the injection port 3, the floating core 2 is moved toward the communication port 5, and the resin is discharged into the sub-cavity 6 through the communication port 5, wherein a reinforced resin is charged in the main cavity 1 along its inner wall, a non-reinforced resin is also charged along the center of the main cavity 1, the floating core 2 is moved to discharge the non-reinforced resin positioned at the center into the sub-cavity 6 while leaving the non-reinforced resin which forms the inner layer on the inner wall of the reinforced resin which forms the outer layer, and the floating core 2 is moved into the sub-cavity 6 through the communication port 5.

The second aspect of the invention remedies the disadvantages involved in the first aspect of the invention which forms the hollow shaped molded article using the reinforced resin containing reinforced fiber, namely the difficulty of reusing the excess resin because of the reinforced resin having high strength discharged into the sub-cavity 6 and the damage to smoothness of the inner wall of the hollow shaped molded article. The hollow shaped molding device according to the second aspect of the invention is basically the same as the device according to the first aspect of the invention.

In the hollow shaped molding process according to the second aspect of the invention, an injection unit used for so-called two-color injection molding or two-layer injection molding is used to inject the molten resin into the main cavity 1 of the mold. As shown in FIG. 7 and FIG. 8 for example, injection units which are provided with two injection cylinders 21a, 21b and can inject two resins without mixing them are used. The injection cylinder 21a injects a reinforced resin containing at least either of a filler reinforcing material or a fiber reinforcing material, and the injection cylinder 21b injects a non-reinforced resin containing no filler-reinforcing material or fiber-reinforcing material. The injection unit shown in FIG. 7 has the two injection cylinders 21a, 21b connected to an injection nozzle 23 via a change-over valve 22. Injection is made by switching between the injection cylinders 21a, 21b. And, the injection unit shown in FIG. 8 extrudes a resin from the injection cylinder 21b into the center of a resin extruded from the injection cylinder 21a and injects the double-layered resin from the injection nozzle 23.

Now, a molding procedure by the hollow shaped molding process according to the second aspect of the invention by using the molding device shown in FIG. 1 and the injection unit shown in FIG. 7 or FIG. 8 will be described with reference to FIG. 9 to FIG. 12.

First, as shown in FIG. 9, the movable shaft 7 is moved forward to close the communication port 5, and a reinforced resin and a non-reinforced resin are injected into the main cavity 1. By this injection, the reinforced resin is charged along the wall of the main cavity 1 and the non-reinforced resin is charged along the center of the main cavity 1. Specifically, when the injection unit shown in FIG. 7 is used, the reinforced resin is first injected from the injection cylinder 21a, then the change-over valve 22 is switched, and the non-reinforced resin is injected from the injection cylinder 21b. When the injection unit shown in FIG. 8 is used, the reinforced resin of the injection cylinder 21a and the non-reinforced resin of the injection cylinder 21b are injected substantially at the same time (the reinforced resin is injected slightly earlier).

The reinforced resin in the second aspect of the invention is a resin having its mechanical properties improved by adding a filler-reinforcing material or a fiber-reinforcing material, or both of them. A base resin for the reinforced resin can be a general thermoplastic resin such as polystyrene, polyolefin, polyamide, acrylic resin, POM, PPS, modified PPE or polycarbonate. The filler-reinforcing material can be talc, wollastonite or calcium carbonate. And, the fiber-reinforcing material can be glass fiber, carbon fiber or metal fiber. The content of the filler-reinforcing material and/or the fiber-reinforcing material in the reinforced resin is selected according to the physical properties required for application, but generally 5% by weight or more. And, the reinforced resin according to the second aspect of the invention contains at least either of the filler-reinforcing material or the fiber-reinforcing material as described above. But, the disadvantages described above are prominent when the reinforced resin contains the fiber-reinforcing material, and the adoption of the second aspect of the invention is much advantageous.

The non-reinforced resin according to the second aspect of the invention is a resin which has its mechanical properties not improved by the above-described filler-reinforcing material or the fiber-reinforcing material. Basically, this resin does not contain a filler-reinforcing material or a fiber-reinforcing material, but may contain a filler-reinforcing material and/or a fiber-reinforcing material within a range (in a range that the mechanical properties are not improved substantially) not deteriorating the smoothness of the inner surface to be described afterward. Specifically, a filler-reinforcing material or a fiber-reinforcing material or both of them may be added in a range of 3% by weight or below. Besides, the non-reinforced resin can be the same thermoplastic resin as the base resin for the reinforcing resin described above. This non-reinforced resin and the base resin for the above-described reinforced resin may be same or different types. But, it is preferable to use the same type of resin in order to tightly adhere an outer layer 24 and an inner layer 25 (see FIG. 13) of a molded article to make it monolithic.

To the reinforced resin and the non-reinforced resin, various additives and pigments may be added as required.

Then, as shown in FIG. 10, the movable shaft 7 is slightly moved backward in the sub-cavity 6 to open the communication port 5, and the compressed fluid is injected from the injection port 3. Thus, the floating core 2 is moved forward to the sub-cavity 6 to push the molten resin (substantially non-reinforced resin) which delays to cool at the center into the sub-cavity 6 through the communication port 5 while leaving the reinforced resin which has started to cool and cure along the wall of the main cavity and the non-reinforced resin having a certain thickness on the inner surface of the reinforced resin. When the floating core 2 has passed by, a hollow section 8 having substantially the same diameter as the diameter of the floating core 2 is formed. Therefore, the diameter of the hollow section 8 to be formed can be adjusted by the diameter of the floating core 2 to be selected. The resin having the hollow section 8 formed is pressed against the inner wall of the main cavity 1 to keep its shape by the pressure of the compressed fluid introduced under pressure.

The compressed fluid used above may be the same gas or liquid as used in the first aspect of the invention, and its injecting process is also the same as in the first aspect of the invention.

When the compressed fluid is further injected, the floating core 2 enters the sub-cavity 6 and positioned on the movable shaft 7 as shown in FIG. 11. And, the sub-cavity 6 is filled with the resin (substantially the non-reinforced resin) discharged from the communication port 5 and the compressed fluid which has entered the sub-cavity 6 while pushing the floating core 2. Substantially most of the reinforced resin on the wall of the main cavity 1 remains in the main cavity 1, while the non-reinforced resin at the center of the main cavity 1 is substantially discharged into the sub-cavity 6 except its portion adhered to the inner surface of the reinforced resin. As a result, most of the resin in the sub-cavity 6 is the non-reinforced resin, and its reuse is facilitated. To further facilitate the reuse, it is preferred that the volume of the sub-cavity 6 is reduced, a small disposable cavity (not shown) having a small cross-sectional area is connected thereto, and the discharged resin is removed as a small or thin secondary molded article which can be easily pulverized.

Although the resin may be cooled in the state as shown in FIG. 11, but when the movable shaft 7 is moved backward as shown in FIG. 12, the hollow section 8 in the sub-cavity 6 is increased, and the secondary molded article 10 (see FIG. 6) can be made thin, facilitating to break it for reuse. In either case, the resin is cooled with the pressure in the mold kept, the compressed fluid is discharged from the hollow section 8, the movable shaft 7 is removed from the sub-cavity 6, and the molded article is removed.

The removed molded article has the same appearance as that of the one obtained according to the first aspect of the invention, as shown in FIG. 6. As described above, since the floating core 2 is left in the secondary molded article 10, a pipe is originally obtained with its ends open.

A hollow shaped molded article (main molded article 9) formed by the hollow shaped molding process according to the second aspect of the invention has a two-layered structure of an outer layer 24 made of the reinforced resin and an inner layer made of the non-reinforced resin as shown in FIG. 13. The outer layer 24 made of the reinforced resin provides the hollow shaped molded article with a high mechanical strength, and the inner layer 25 made of the non-reinforced resin provides the inner surface with smoothness.

According to the hollow shaped molding process according to the second aspect of the invention, as to a hollow shaped molded article having prescribed outer and inner diameters, a thickness $T_0$ of the outer layer 24 made of the reinforced resin and a thickness $T_1$ of the inner layer 25 made of the non-reinforced resin can be controlled by the injection volume of each resin and timing of starting the injection (injection delay time: time between the injection of the reinforced resin and the injection of the non-reinforced resin) of the reinforced resin and the non-reinforced resin next to it, and a two-layered hollow shaped molded article of $T_1/T_0$, $1/100 \leq T_1/T_0 \leq 5$, and a centerline average roughness $R_a$ of 5 $\mu$m or below can be produced. The injection delay time is selected according to $T_1$, $T_0$, and $T_1/T_0$ required, and generally 0 to 30 seconds though variable depending on the type of resin used.

When the $T_1/T_0$ is less than $1/100$, the inner surface has poor smoothness, and when the product is used as pipes, a flow resistance of the fluid is excessively increased, and when this ratio exceeds 5, a strength demanded for the hollow shaped molded article cannot be attained. To attain higher inner surface smoothness and strength, $1/20 \leq T_1/T_0 \leq 2$ is desired. Particularly, when the article is used as pipes through which a fluid flows for a long period, and to which an inner pressure is applied, it is desired to satisfy the condition of $1/20 \leq T_1/T_0 \leq 2$.

When the centerline roughness $R_a$ of the inner surface (JIS B 0601) becomes 5 $\mu$m or more and the hollow shaped molded article is used as pipes, a flow resistance to a fluid increases extremely, a crack is easily caused in an uneven spot, and it is not durable for a long-term use. The centerline roughness $R_a$ is expressed in the unit of $\mu$m by the following equation when an evaluation length L portion is taken in a direction of its center line from an extracted curve, the center line of the taken part is on X axis, an axial magnification is on Z axis, and the extracted curve is expressed by $Z=f(x)$.

$$Ra = \frac{1}{L \cdot \int_0^L |f(x)| \, dx}$$

Now, the hollow shaped molding process and device according to a third aspect of the invention for achieving the first and third objects will be described.

As shown in FIG. 14, the third aspect of the invention relates to a hollow shaped molding process in that after injecting a molten resin into a main cavity 1 which has an injection port 3 provided with a floating core 2 at one end and a sub-cavity 6 at the other end through an openable communication port 5, a compressed fluid is introduced under pressure from the injection port 3, the floating core 2 is moved toward the communication port 5, and the resin is discharged into the sub-cavity 6 through the communication port 5, wherein after starting to move the floating core 2, the floating core 2 is moved into the sub-cavity 6 through the communication port 5 while controlling the moving speed of the floating core 2.

As shown in FIG. 14, in the hollow shaped molding device that the floating core 2 and the injection port 3 for injecting the compressed fluid which pushes to move the floating core 2 to the other end of the main cavity 1 are provided at one end of the main cavity 1, and the openable communication port 5 communicated with the sub-cavity 6 is provided at the other end of the main cavity 1, wherein the communication port 5 has a size through which the floating core 2 can pass, the sub-cavity 6 comprises a primary sub-cavity 6a communicated with the communication port 5 and a secondary sub-cavity 6b communicated with the primary sub-cavity 6a through a connection port 31, and the connection port 31 has an open area smaller than that of the communication port 5.

Now, the hollow shaped molding device according to the third aspect of the invention will be described with reference to FIG. 14 and FIG. 15.

The hollow shaped molding device according to the third aspect of the invention is almost the same as the device according to the first aspect of the invention except that the sub-cavity 6 has a different structure.

The sub-cavity 6 comprises the primary sub-cavity 6a directly connected to the communication port 5 and the secondary sub-cavity 6b communicated with the primary sub-cavity 6a through the connection port 31.

As will be described afterward, the primary sub-cavity 6a has a volume to accommodate the floating core 2 to be pushed and moved by the compressed fluid injected through the injection port 3 with the main cavity 1 filled with the molten resin and part of the resin discharged through the communication port 5 as the floating core 2 is moved. Specifically, when it is assumed that the primary sub-cavity 6a has a volume $V_1$ and the floating core 2 has a volume Vc, it is desired to have a volume in a range of $10\,Vc \geq V_1 \geq 2\,Vc$. When the primary sub-cavity 6a has a smaller volume, an initial speed for finally reaching the floating core 2 to the communication port 5 is hard to attain even if the floating core 2 is moved by injecting the compressed fluid with the main cavity 1 filled with the molten resin. In other words, if the volume Vc of the primary sub-cavity 6a is excessively small, an undesired pressure loss is readily caused when the floating core 2 is started to move by the fluid pressure. And, if the volume Vc of the primary sub-cavity 6a is excessively large, the speed of the floating core 2 can not be controlled adequately, and the thickness distribution of the main molded article obtained is hardly prevented from being deviated.

The secondary sub-cavity 6b is communicated with the primary sub-cavity 6a through the connection port 31. The connection port 31 which communicates the primary sub-cavity 6a and the secondary sub-cavity 6b has an open area which is smaller than that of the communication port 5 which communicates the main cavity 1 and the primary sub-cavity 6a. When the primary sub-cavity 6a is filled with the resin and the resin is further discharged from the communication port 5, the resin filling the primary sub-cavity 6a is discharged into the secondary sub-cavity 6b. At this time, a flow resistance of the resin from the communication port 5 to the sub-cavity 6 is increased because the open area of the connection port 31 is smaller than that of the communication port 5, and the flowing speed of the resin into the sub-cavity 6 is lowered. Accordingly, the moving speed of the floating core 2 is restricted.

The secondary sub-cavity 6b can be determined to have a volume so that a total (the total volume of the sub-cavity 6) of its volume with that of the primary sub-cavity 6a is equal to or larger than a total of the resin discharged from the communication port 5 and a volume of the floating core 2. And, the sub-cavity 6b is preferably branched into a plurality of plate-shaped or thin rod-shaped cavities as illustrated. When the secondary sub-cavity 6b is designed as described above, a secondary molded article 32 has a plurality of plate-shaped or thin rod-shaped branches as shown in FIG. 21, so that it is advantageous that the secondary molded article 32 can be readily crushed and reused after separating from the main molded article 9.

When the secondary sub-cavity 6b is branched into the plurality of plate or thin rod shapes as illustrated, the flow resistance of the resin in the secondary sub-cavity 6b can be increased, so that the flow resistance of the resin into the sub-cavity 6 or the flowing speed of the resin into the sub-cavity 6 can be made different before and after filling the primary sub-cavity 6a. These branched parts may have an arbitrary cross-sectional shape such as a circle, a semicircle, or a rectangle. But, it is preferable that a flow cross-sectional ratio A of the primary sub-cavity 6a to the secondary sub-cavity 6b is $1/100 \leq A \leq 1/3$ at any cross section of the secondary sub-cavity 6b. If this flow cross-sectional ratio A is less than $1/100$, the flow of the resin from the primary sub-cavity 6a into the secondary sub-cavity 6b becomes difficult, and the movement of the floating core 2 is easily stopped. And, if this flow cross-sectional ratio A exceeds $1/3$, the flow resistance of the resin within the secondary sub-cavity 6b cannot be increased so much, each branch becomes thick, and ruining the significance of branching the secondary sub-cavity 6b into the plurality of plate or thin rod shapes.

The flow cross-sectional ratio A above can be determined by (the flow cross-sectional area of the secondary sub-cavity 6b)/(the flow cross-sectional area of the primary sub-cavity 6a), and each flow cross-sectional area is a cross-sectional area in a direction at right angles to a direction that the resin flows.

The reciprocally movable shaft 7 is inserted toward the communication port 5 through substantially the center of the primary sub-cavity 6a. As shown in FIG. 14, the movable shaft 7 is moved forward and forced against the peripheral wall of the communication port 5 with the periphery of its front end to close the communication port 5, and moved backward to open the communication port 5 as shown in FIG. 15. And, the front end of the movable shaft 7 is designed to receive the floating core 2 which enters the primary sub-cavity 6a when the compressed fluid is injected.

In this embodiment, the communication port 5 is opened or closed by the forward or backward movement of the movable shaft 7, but means other than the movable shaft 7 may be used to open or close the communication port 5.

The molding procedure according to the hollow shaped molding process by the third aspect of the invention will be described with reference to FIG. 16 to FIG. 20.

First, with the movable shaft 7 moved forward to close the communication port 5, the molten resin is injected from the gate 4 into the main cavity 1 to fill the main cavity with the resin. The resin and the injection method used here are the same as in the hollow shaped molding process according to the first aspect of the invention.

Then, as shown in FIG. 17, the movable shaft 7 is moved backward to open the communication port 5 to an extent so that the floating core 2 can be moved into the primary sub-cavity 6a. The compressed fluid and its injecting method here are the same as in the hollow shaped molding process according to the first aspect of the invention.

After injecting the compressed fluid, the floating core 2 is moved to the primary sub-cavity 6a while pushing the molten resin, which is slowly cooled at the center, into the primary sub-cavity 6 through the communication port 5 while leaving the resin which started to cool and cure along the inner wall of the main cavity 1 as shown in FIG. 17. When the floating core 2 has passed by, a hollow section 8 having substantially the same diameter as the diameter of the floating core 2 is formed. Therefore, the diameter (the inner diameter of the hollow shaped molded article) of the hollow section 8 to be formed can be adjusted by the diameter of the floating core 2 to be selected. And, the resin having the hollow section 8 formed is pressed against the inner wall of the main cavity 1 to keep its shape by the pressure of the compressed fluid introduced under pressure.

As shown in FIG. 18, the movable shaft 7 is further moved backward, the primary sub-cavity 6a filled with the resin, and the floating core 2 is moved forward to discharge the molten resin from the communication port 5, then the resin in the primary sub-cavity 6a is discharged from the connection port 31 into the secondary sub-cavity 6b.

Since the communication port 5 has a relatively large open area and the primary sub-cavity 6a also has a relatively large flow cross-sectional area, the flow resistance of the resin into the sub-cavity 6 is small until the primary sub-cavity 6a is filled with the resin, so that the resin flows easily into the sub-cavity 6. Therefore, by injecting the compressed fluid, the floating core 2 is started to move smoothly and moved forward while discharging the molten resin at a relatively high speed. But, the connection port 31 has an open area smaller than the communication port 5, making the resin to flow slowly from the primary sub-cavity 6a into the secondary sub-cavity 6b. Once the primary sub-cavity 6a is filled, the flow resistance of the resin into the sub-cavity 6 is increased, suppressing the speed of the resin flowing into the sub-cavity 6. Accordingly, the moving speed of the floating core 2 is restrained, the distribution of thickness of the main molded article 9 (see FIG. 21) can be made uniform, and the smoothness of the inner surface can be improved. If this moving speed is restrained before the floating core 2 reaches the curve, the thickness in the peripheral direction at the curve where the distribution of thickness is particularly variable can be made uniform.

As described above, when the secondary sub-cavity 6b is branched into a plurality of plate or thin rod shapes and a flow cross-sectional ratio A of the primary sub-cavity 6a to the secondary sub-cavity 6b is $1/100 \leq A \leq 1/3$, the moving speed of the floating core 2 can be restrained more securely. And, when the primary sub-cavity 6a having a volume $V_1$ and the floating core 2 having a volume Vc are determined to meet $10 \text{ Vc} \geq V_1 \geq 2 \text{ Vc}$, the speed of the floating core 2 can be fully controlled while securing attaining the initial speed so that the floating core 2 finally reaches the communication port 5.

While controlling and restraining the moving speed of the floating core 2 as described above, the floating core 2 is moved forward to enter the primary sub-cavity 6a as shown in FIG. 20. The floating core 2 is placed on the movable shaft 7 within the primary sub-cavity 6a. And, it is preferable that when the volume of the sub-cavity 6 is determined to be larger than a total of the volumes of the discharged resin and the floating core 2, and the hollow section 8 is also formed in the primary sub-cavity 6a as shown in FIG. 20, a part of the secondary molded article 32 (see FIG. 21) molded within the primary sub-cavity 6a can be made thin and easily crushed.

After cooling the resin within the mold, the compressed fluid is discharged from the hollow section 8, the movable shaft 7 is further moved backward and separated from the primary sub-cavity 6a, and a molded article is removed from the mold. When a gas is used as the compressed fluid, it can be discharged by opening the injection port 3 to the atmosphere, but it is preferable to collect into a collection tank (not shown) so as to be used repeatedly.

The molded article removed is as shown in FIG. 21 and has a main molded article 9 formed by the main cavity 1 and a secondary molded article 32 formed by the sub-cavity 6. A thin constricted part 11 which is formed by the constricted communication port 5 is between the main molded article 9 and the secondary molded article 32, and the main molded article 9 and the secondary molded article 32 can be separated at this constricted part 11 to attain a desired hollow shaped molded article. As described above, since the floating core 2 is left within the secondary molded article 32, a pipe consisting of the main molded article 9 is originally obtained with its ends open.

In the above embodiment, the moving speed of the floating core 2 when it was started to move is controlled by designing the flow cross-sectional area A of the primary sub-cavity 6a to the secondary sub-cavity 6b and increasing the flow resistance of the resin residue into the sub-cavity 6 after the resin is discharged into the sub-cavity 6, but the method of controlling the moving speed of the floating core 2 is not limited to the above. As another controlling method, a shift of the reciprocally movable shaft 7 within the sub-cavity 6 toward the communication port 5 is controlled in synchronization with the injection timing of the compressed fluid, and the volume of the sub-cavity 6 after moving the resin is controlled.

In the above embodiments, descriptions have been made on the molding of a curved pipe, but the hollow shaped molded article to be molded by the invention may be other molded articles such as a straight pipe and others.

In the above first to third aspects of the invention, to further facilitate the reuse of the excess resin discharged from the main cavity 1 into the sub-cavity 6, it is desirable to use the floating core 2 made of a resin which is not deformed heavily when molding. In this case, the floating core 2 is preferably made of a resin compatible with the resin used for molding, more desirably made of the same type of resin as the resin used for molding (made of the same type of resin as the non-reinforced resin for forming the inner layer in the molding process according to the second aspect of the invention). Thus, the floating core 2 made of the resin and the excess resin discharged from the main cavity 1 can be reused together. In other words, the secondary molded article can be entirely reused as the molding material.

EXAMPLE 1

A U-shaped pipe having an outer diameter of 3 cm, an inner diameter of 2.4 cm, a wall thickness of 3 mm and an overall length of 35 cm was molded by the molding device as shown in FIG. 1 and injection molding device ("BMT4000" manufactured by Battenfeld, Germany).

The main cavity 1 has a diameter of 3 cm, the communication port 5 has a diameter of 2.6 cm, and the sub-cavity 6 has a diameter of 4 cm, a length of 13.3 cm and a volume of about 167 cm$^3$.

The floating core 2 was made of polyamide 66 ("Reona 1300S" manufactured by Asahi Kasei Kogyo Kabushiki Kaisha) and had a diameter of 2.4 cm (a volume of about 7.3 cm$^3$, a weight of about 8 g), and a gas generator for gas blow injection molding ("Air Mold" manufactured by Asahi Engineering Kabushiki Kaisha) is used to supply the compressed fluid. And, the compressed fluid is nitrogen gas.

A molding material, polyamide 66 ("Reona 1300S" manufactured by Asahi Kasei Kogyo Kabushiki Kaisha), was injected at a resin temperature of 290° C. under an injection pressure of 90 kg/cm$^2$G, in one second after completing the injection, nitrogen gas was injected at a pressure of 200 kg/cm$^2$ to move the floating core 2 within the mold.

A molded article was removed in 30 seconds after injecting the compressed gas. The obtained molded article was as shown in FIG. 6. This molded article was separated into the main molded article 9 and the secondary molded article 10 at the constricted part 11. The main molded article 9 thus produced was a U-shaped pipe having an outer diameter of about 3 cm, an average inner diameter of 2.4 cm, an average wall thickness of 3 mm, and an overall length of 35 cm with both ends open. The pipe had a deviation of wall thickness of ±35% or below at the curved section.

The secondary molded article 10 could be reused easily as the molding material because the same resin was used for the floating core remained in it and the molding material.

EXAMPLE 2

A U-shaped pipe was molded by following the procedure of Example 1 except that the floating core 2 was a steel ball having a diameter of 2.4 cm (a volume of about 7.3 cm$^3$, a weight of about 57 g).

A molded article was removed in 30 seconds after injecting the compressed gas at the same pressure of 200 kg/cm$^2$ as in Example 1. When this molded article was separated into the main molded article 9 and the secondary molded article 10 at the constricted part 11, the floating core 2 was found stuck in the main molded article 9, thus a complete hollow shaped molded article could not be produced.

Therefore, molding was performed with the compressed gas increased to a pressure of 250 kg/cm$^2$, a molded produced was removed in 30 seconds after injecting the compressed gas, and it was separated into the main molded article 9 and the secondary molded article 10 at the constricted part 11. Thus, a complete hollow shaped molded article was obtained. This molded article has an outer diameter of about 3 cm, an average inner diameter of 2.4 cm, and an average wall thickness of 3 mm. And it had a deviation of wall thickness of ±40% or more at the curved section.

EXAMPLE 3

A two-layered hollow U-shaped pipe having an outer diameter of 3 cm, an inner diameter of 2.4 cm, a wall thickness of 3 mm, and an overall length of 35 cm as shown in FIG. 13 was molded by the same molding device as in Example 1 (see FIG. 1) and injection molding device ("BMT4000" manufactured by Battenfeld).

The floating core 2 was made of polyamide 66 ("Reona 1300S" manufactured by Asahi Kasei Kogyo Kabushiki Kaisha) and had a diameter of 2.4 cm (a volume of about 7.3 cm$^3$, a weight of about 8 g), and a gas generator for gas blow injection molding ("Air Mold" manufactured by Asahi Engineering Kabushiki Kaisha) was used to supply the compressed fluid. And, the compressed fluid was nitrogen gas.

As a reinforcing resin for forming the outer layer 24, polyamide 66 ("Reona 1300G" manufactured by Asahi Kasei Kogyo Kabushiki Kaisha) containing 33% by weight of glass fiber was used, and as a non-reinforced resin for forming the inner layer 25, polyamide 66 ("Reona 1300S" manufactured by Asahi Kasei Kogyo Kabushiki Kaisha).

First, 80 cm$^3$ of the reinforced resin was injected at the resin temperature of 290° C. under an injection pressure of 90 kg/cm$^2$G; in 0.1 second after completing the injection, 160 cm$^3$ of the non-reinforced resin was injected at the resin temperature of 290° C. under an injection pressure of 60 kg/cm$^2$G; in one second after completing the injection, nitrogen gas was injected at a pressure of 100 kg/cm$^2$ to move the floating core 2 within the mold; and a molded article was removed after cooling for 30 seconds.

The molded article was separated into the main molded article 9 and the secondary molded article 10 at the constricted part 11. The main molded article 9 thus produced was a U-shaped pipe having an outer diameter of about 3 cm, an average inner diameter of 2.4 cm, an average wall thickness of 3 mm, and an overall length of 35 cm with both ends open. Its inner surface was measured for a centerline average roughness $R_a$ by "Surfcom 575A-3D470" (a product of Tokyo Seimitsu Co., Ltd.) to find that $R_a$=1.5 μm, indicating good smoothness.

When a ratio $T_1/T_0$ of the wall thickness $T_1$ of the inner layer 25 to the wall thickness $T_0$ of the outer layer 24 was determined by measuring each thickness at 10 points of the produced pipe, $T_1/T_0$ was ½ in average, ¼ in minimum, and 1 in maximum.

The produced pipe was subjected to an endurance test using a hot water of 80° C. with an inner pressure of 3 kg/cm$^2$ applied for 1000 hours. As a result, it did not have any problem such as an increase in flow resistance or occurrence of a crack, indicating sufficient performance as an industrial pipe.

And, in the resin extruded into the sub-cavity 6, about 85% by weight was the non-reinforced resin not containing glass fiber and the floating core remained in it was the same resin as the non-reinforced resin. Therefore, the extruded resin could be crushed easily by a small crusher and reused.

EXAMPLE 4

A two-layered hollow U-shaped pipe was molded by following the procedure of Example 3 except that the injected volume of the reinforced resin was 120 cm$^3$, the injected volume of the non-reinforced resin was 120 cm$^3$, and the injection starting timing (injection delay time) between the reinforced resin and the non-reinforced resin was 0.6 second.

The produced main molded article was measured for the centerline average roughness $R_a$ and $T_1/T_0$ in the same way as in Example 3 to find that $R_a$=1.4 μm, indicating good smoothness.

And, when a ratio $T_1/T_0$ of the wall thickness $T_1$ of the inner layer to the wall thickness $T_0$ of the outer layer was measured, $T_1/T_0$ was 0.8/2.2 in average, 0.7/2.4 in minimum, and 1.4/1.6 in maximum, and the produced main molded article indicated a high mechanical strength.

COMPARATIVE EXAMPLE 1

A U-shaped pipe was molded by following the procedure of Example 3 except that a reinforced resin was used as the molding material and one injection cylinder was used to mold the single layered hollow pipe.

A molded article was removed in 30 seconds after injecting the compressed gas and separated into the main molded article 9 and the secondary molded article 10 at the constricted part 11.

The produced main molded article 9 had an outer diameter of about 3 cm, an inner diameter of 2.4 cm, and a wall thickness of 3 mm. But, when the centerline average roughness $R_a$ of the inner face was measured in the same way as in Example 3, it was found that $R_a$=6 μm, indicating poor smoothness.

And, when a ratio $T_1/T_0$ of the wall thickness $T_1$ of the inner layer to the wall thickness $T_0$ of the outer layer was measured in the same way as in Example 3, $T_1/T_0$ was ½ in average, ¼ in minimum, and 1 in maximum.

EXAMPLE 5

A U-shaped pipe having an outer diameter of 3 cm, an inner diameter of 2.4 cm, a wall thickness of 0.3 mm and an overall length of 35 cm was molded by the molding device as shown in FIG. 14 and FIG. 15 and injection molding device ("BMT4000" manufactured by Battenfeld, Germany).

The main cavity 1 had a diameter of 3 cm, the communication port 5 had a diameter of 2.6 cm, and the primary sub-cavity 6a had a diameter of 3.4 cm, a length of 4 cm and a volume $V_1$ of about 37 cm³.

The connection port 31 for connecting the primary sub-cavity 6a and the secondary sub-cavity 6b had a diameter of 0.6 cm. On either side of the primary sub-cavity 6a, the secondary sub-cavity 6b extends horizontally in the shape of a thin rod 10 cm long from the connection port 31 and eight branches extending downward each having a diameter of 0.6 cm and a length of 20 cm. The secondary sub-cavity 6b had a volume of about 130 cm³. The floating core 2 was made of polyamide 66 ("Reona 1300S" manufactured by Asahi Kasei Kogyo Kabushiki Kaisha) and had a diameter of 2.4 cm (a volume of about 7.3 cm³, a weight of about 8 g).

A molding material, polyamide 66 ("Reona 1300G" manufactured by Asahi Kasei Kogyo Kabushiki Kaisha) containing 33% by weight, was injected at a resin temperature of 290° C. under an injection pressure of 90 kg/cm²G, in one second after completing the injection, nitrogen gas was injected at a pressure of 100 kg/cm²G through the injection port 3 to move the floating core 2.

A molded article as shown in FIG. 21 was removed in 30 seconds after injecting the compressed gas. The obtained molded article was separated into the main molded article 9 and the secondary molded article 32 at the constricted part 11. The main molded article 9 thus produced was a U-shaped pipe having an outer diameter of 3 cm, an average inner diameter of 2.4 cm, an average wall thickness of 0.3 cm. The pipe had a deviation of wall thickness of ±30% or below at the curved section.

The produced pipe was subjected to an endurance test in an environment of 80° C. with an inner pressure of 3 kg/cm² applied for 2000 hours. As a result, it did not have any problem, having sufficient performance as an industrial curved pipe such as a water pipe or an automobile cooling pipe. And, the main parts of the secondary molded article 32 molded in the sub-cavity 6 were the branched thin rods having a diameter of 0.6 cm, and could be crushed under a small load by a crusher for recycling with ease.

The invention is constructed as described above and provides the following effects.

(1) According to the first aspect of the invention, a hollow shaped molded article with its both ends open originally can be produced easily.

(2) According to the second aspect of the invention, in addition to the effect of (1) above, when a reinforced resin is used to produce a two-layered hollow shaped molded article having a high strength, pipes having a smooth inner surface and only a small flow resistance to a fluid can be produced.

(3) According to the third aspect of the invention, in addition to the effect of (1) above, a hollow shaped molded article having a more uniformly distributed wall thickness can be produced easily.

(4) When the floating core is a resin, in addition to the improvement of smoothness of the inner surface, the resin discharged into the sub-cavity 6 can be reused easily, and the resin can be prevented from being wasted.

Figure 1:
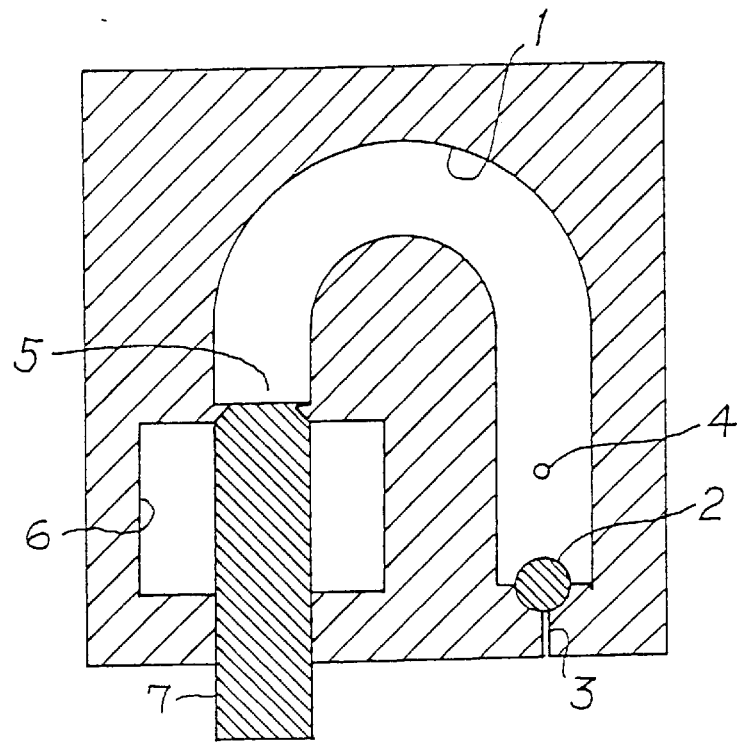
FIG. 1 is a diagram showing an example of the hollow shaped molding device according to first and second aspects of the invention.
Figure 2:
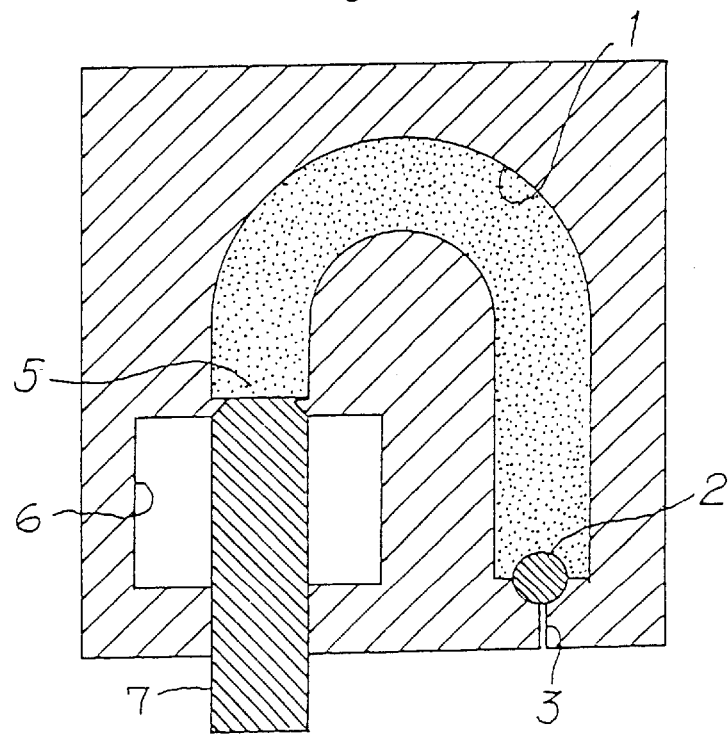
FIG. 2 is a diagram showing a state after injecting a molten resin by the hollow shaped molding process according to the first aspect of the invention.
Figure 3:
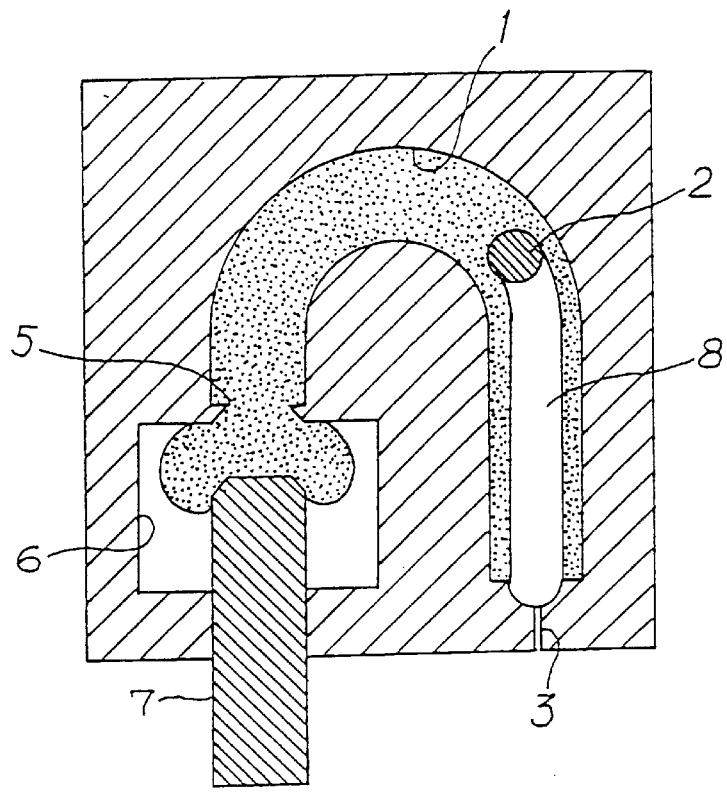
FIG. 3 is a diagram showing a process of injecting a compressed fluid by the hollow shaped molding process according to the first aspect of the invention.
Figure 4:
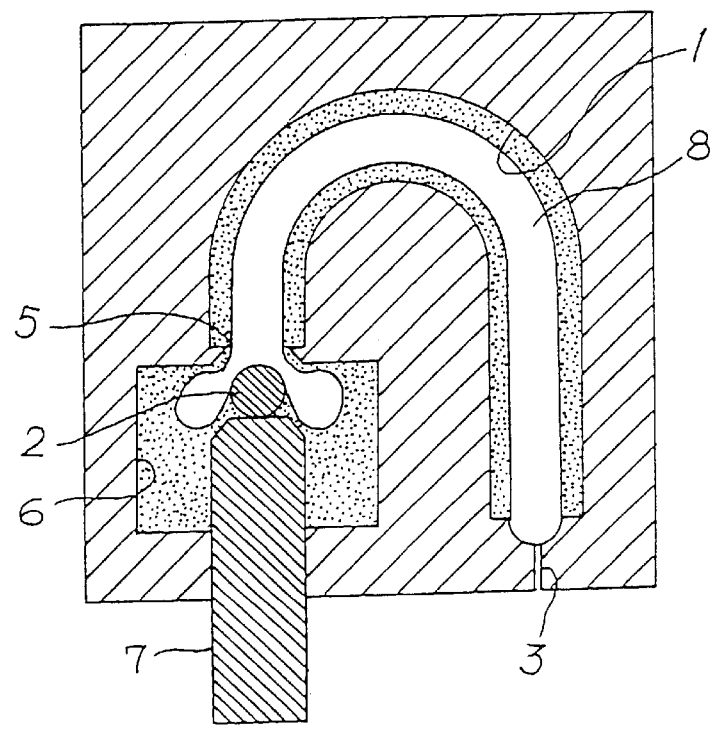
FIG. 4 is a diagram showing a state that a floating core has entered a sub-cavity by the injection of a compressed fluid by the hollow shaped molding process according to the first aspect of the invention.
Figure 5:
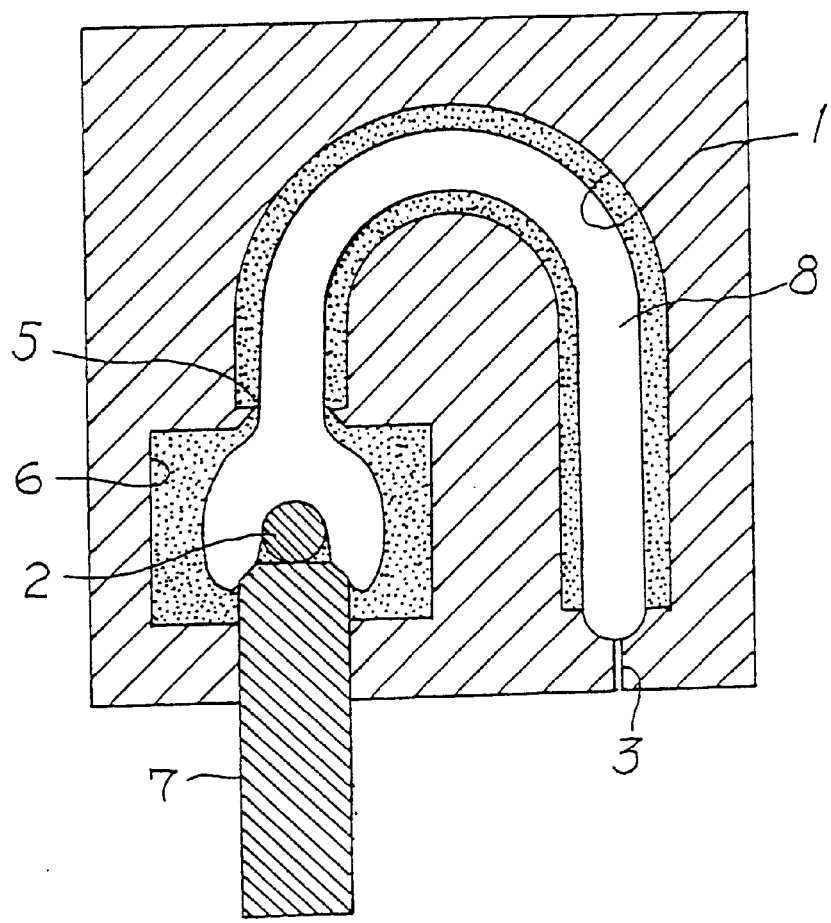
FIG. 5 is a diagram showing a state that a movable shaft was further moved backward after the floating core has entered the sub-cavity by the hollow shaped molding process according to the first aspect of the invention.
Figure 6:
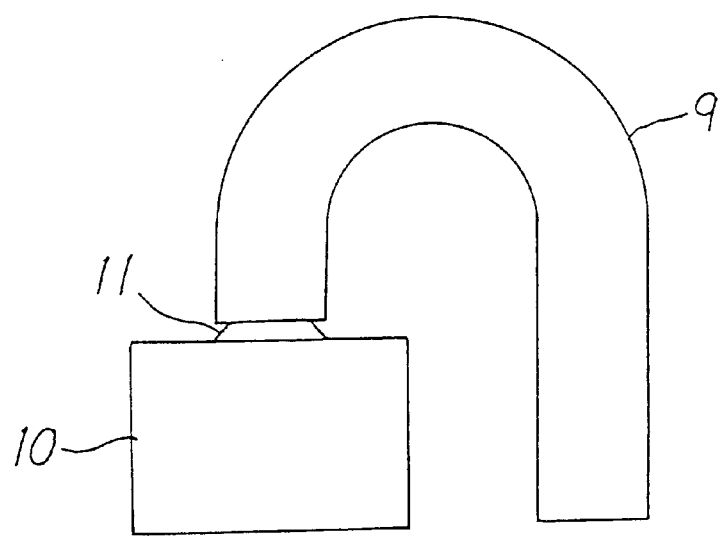
FIG. 6 is a diagram showing a molded article removed from the mold of the hollow shaped molding device shown in FIG. 1 according to the first aspect of the invention.
Figure 7:
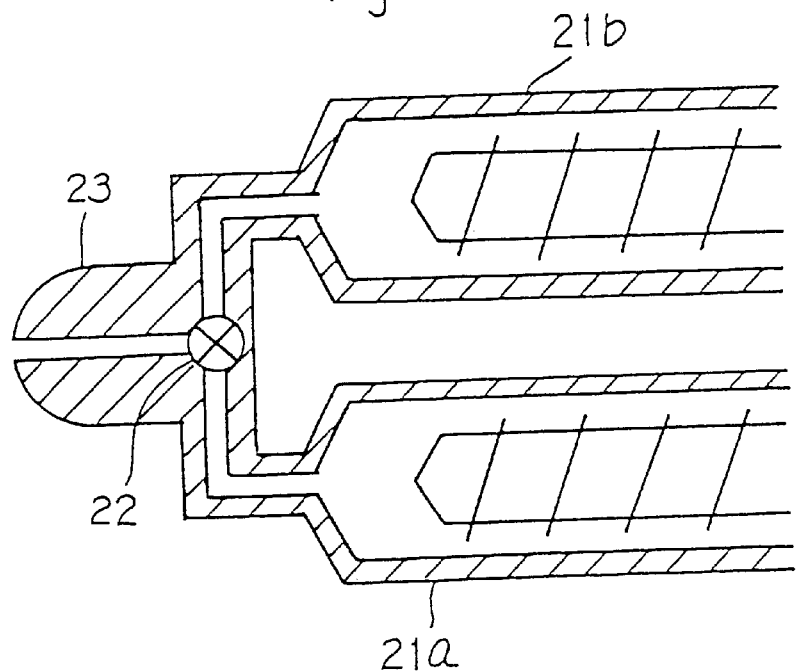
FIG. 7 is a diagram showing an example of the injection device used in the hollow shaped molding process according to a second aspect of the invention.
Figure 8:
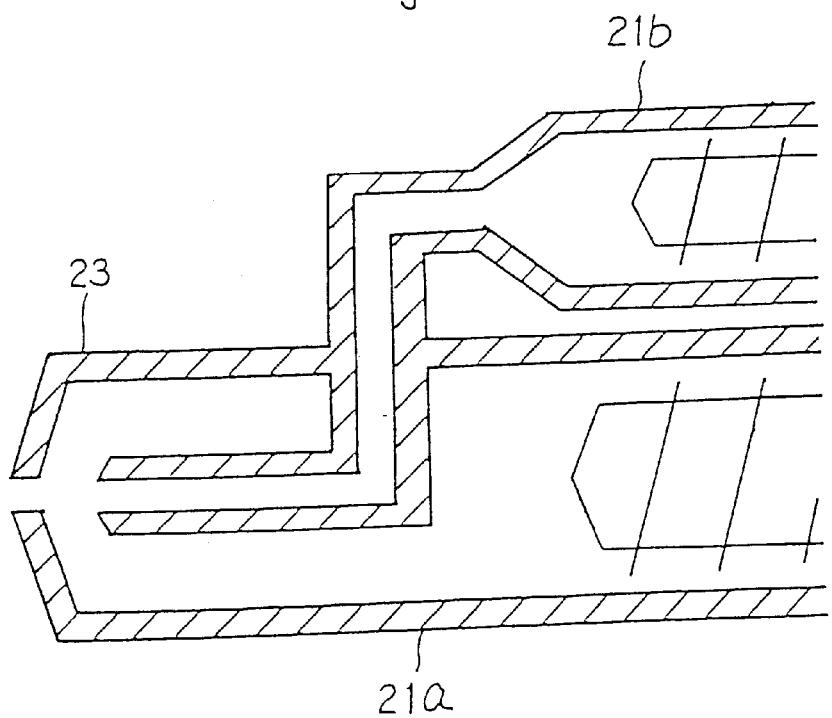
FIG. 8 is a diagram showing another example of the injection device used in the hollow shaped molding process according to the second aspect of the invention.
Figure 9:
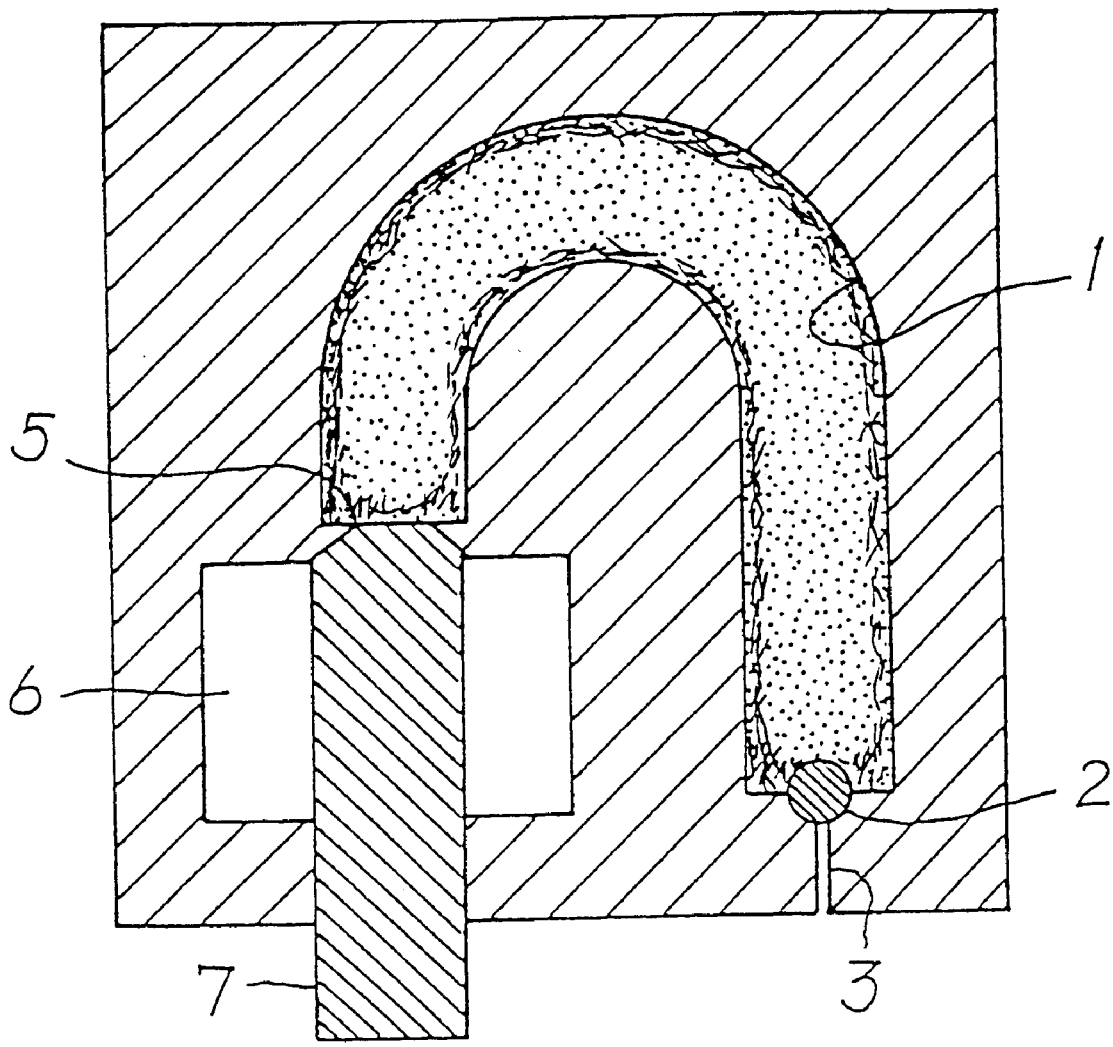
FIG. 9 is a diagram showing a state that the main cavity is filled with a reinforced resin and a non-reinforced resin in the hollow shaped molding process according to the second aspect of the invention.
Figure 10:
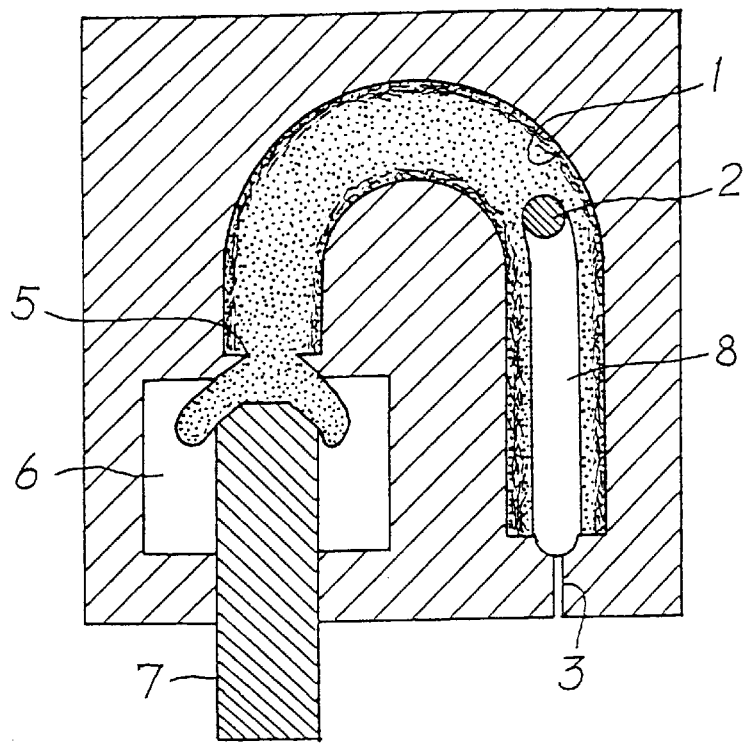
FIG. 10 is a diagram showing a state immediately after starting the injection of a compressed fluid in the hollow shaped molding process according to the second aspect of the invention.
Figure 11:
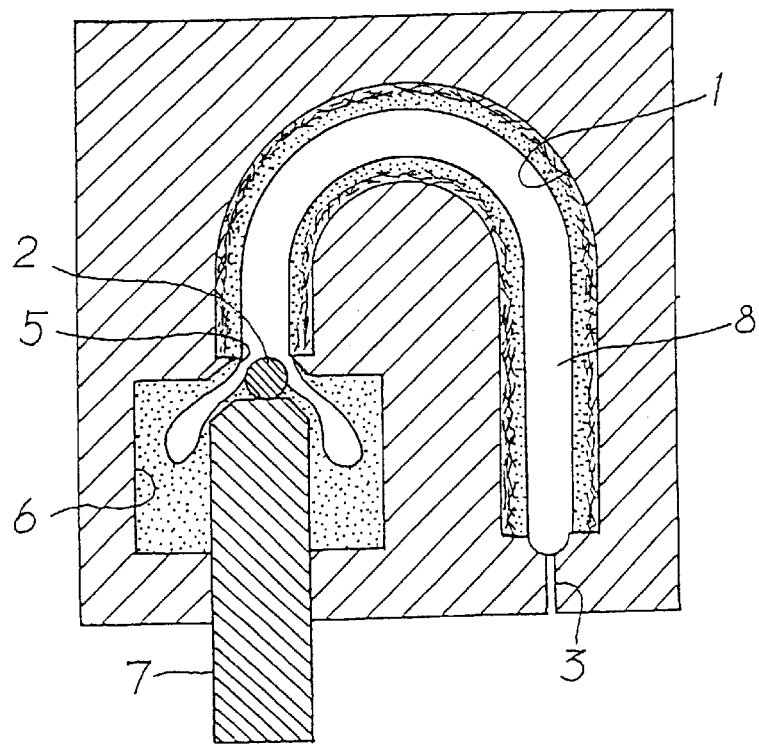
FIG. 11 is a diagram showing a state that the floating core has entered the sub-cavity by the injection of a compressed fluid in the hollow shaped molding process according to the second aspect of the invention.
Figure 12:
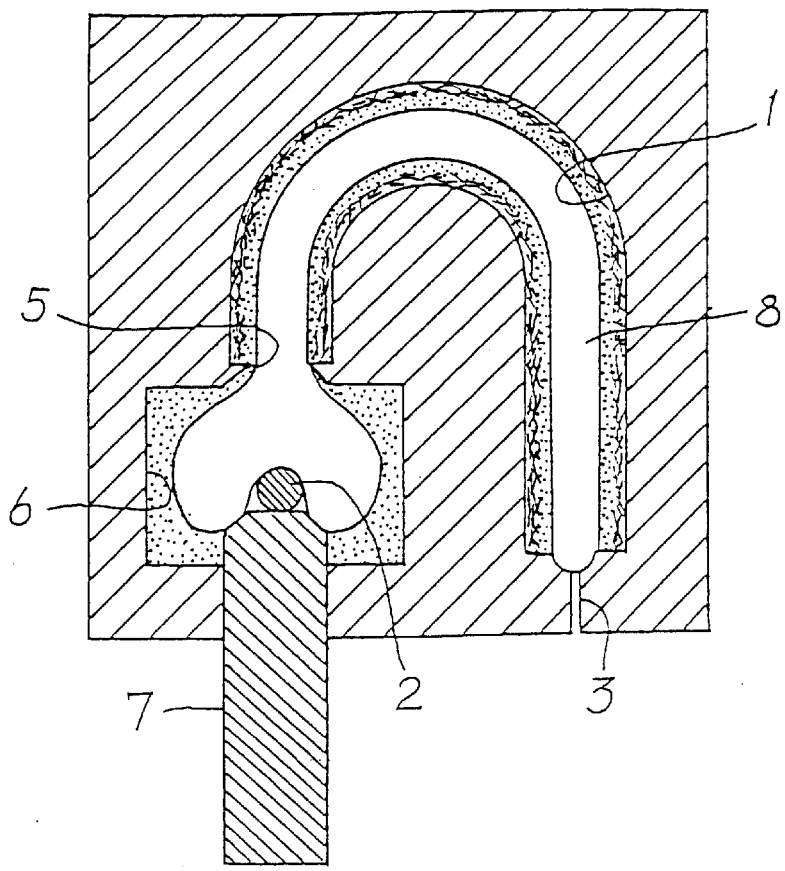
FIG. 12 is a diagram showing a state that the floating core has entered the sub-cavity and the movable shaft moved backward in the hollow shaped molding process according to the second aspect of the invention.
Figure 13:
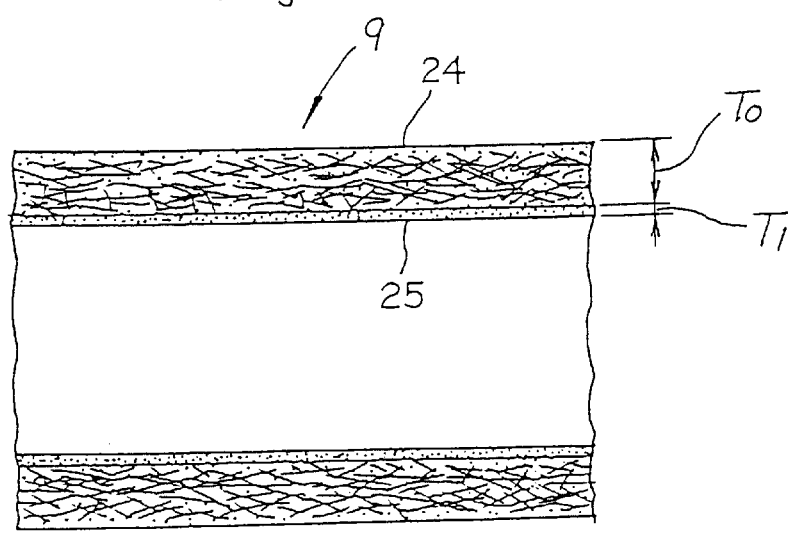
FIG. 13 is an expanded sectional view of a two-layered hollow shaped molded article according to the second aspect of the invention.
Figure 14:
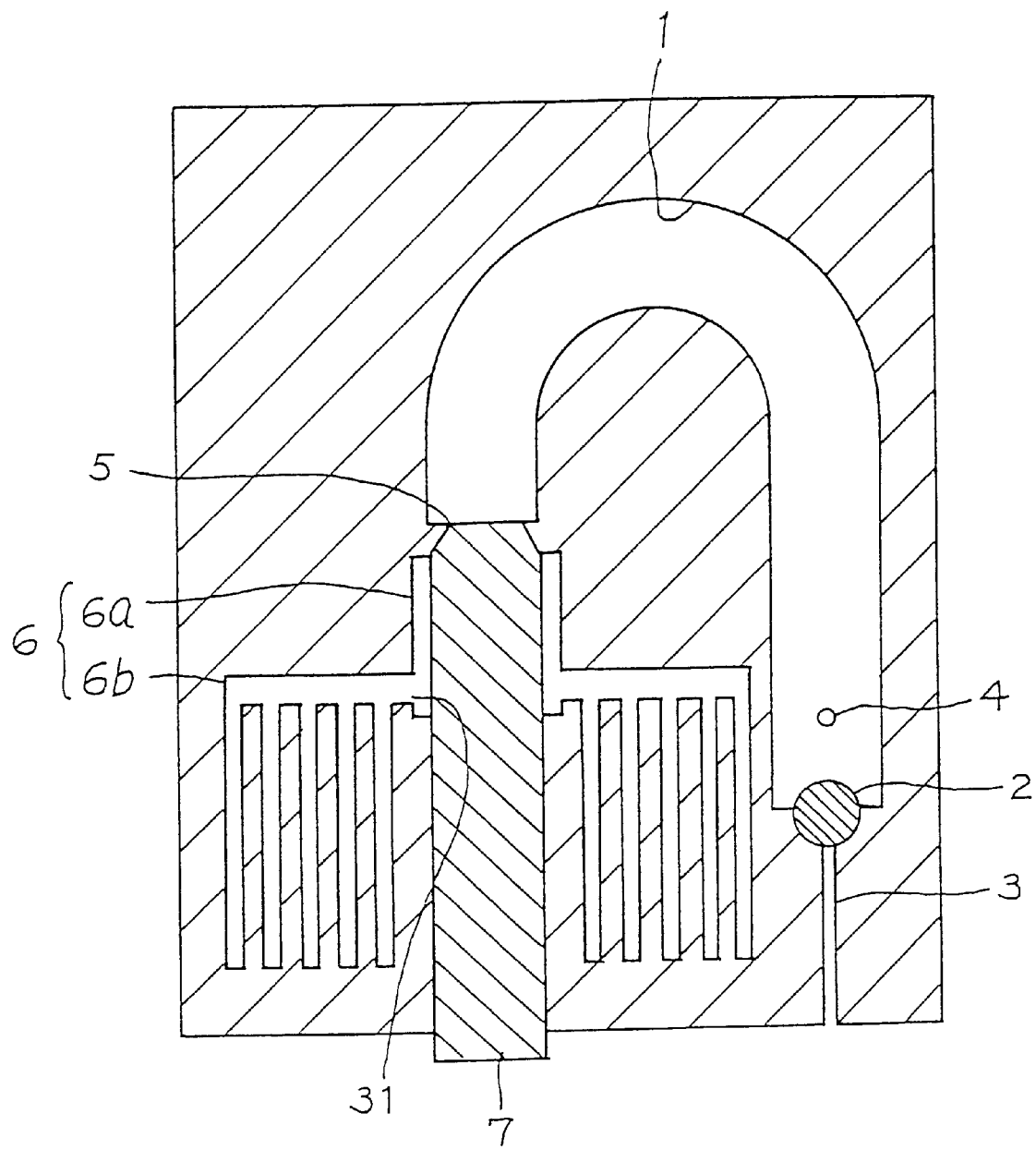
FIG. 14 is a diagram showing an example of the hollow shaped molding device according to a third aspect of the invention.
Figure 15:
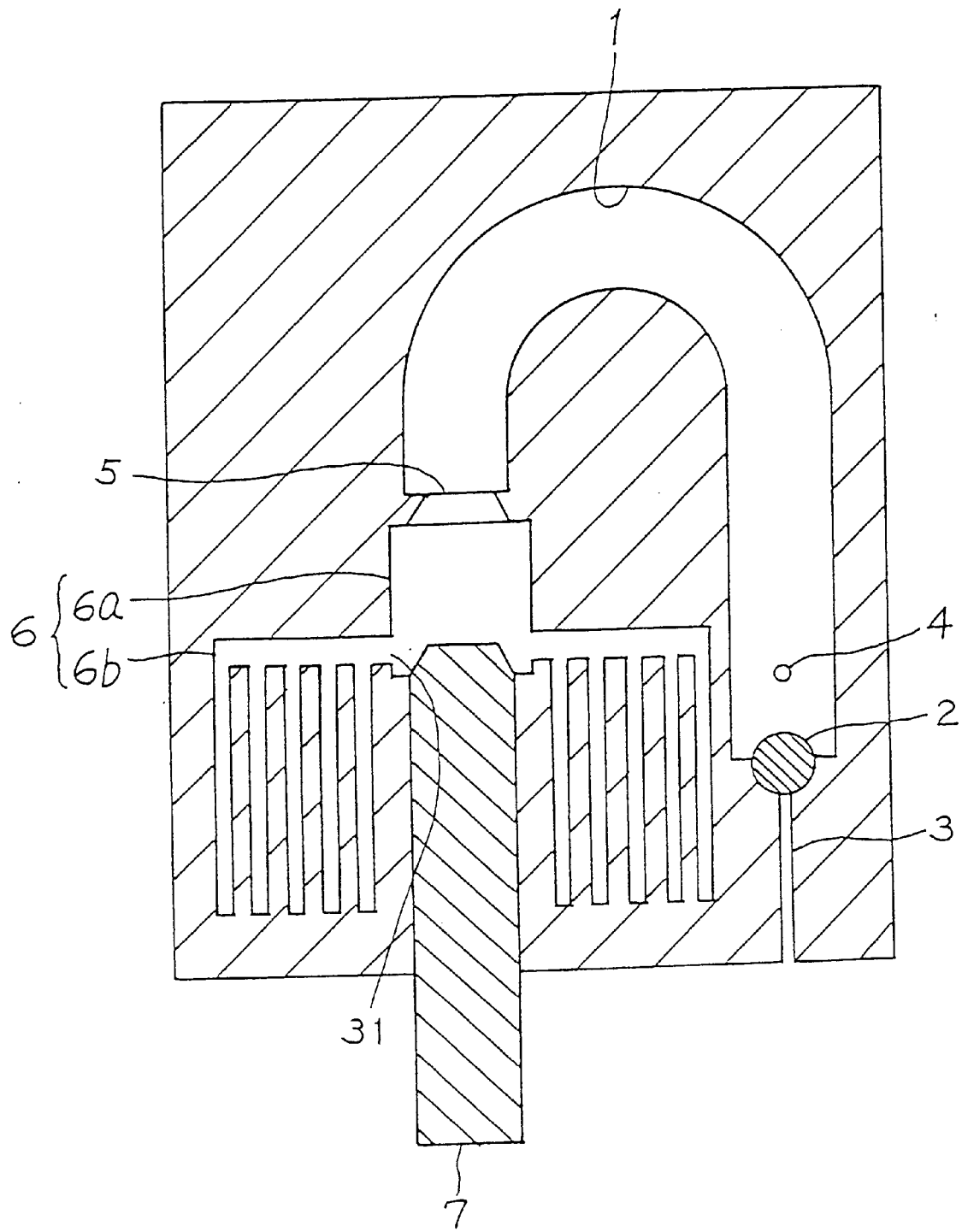
FIG. 15 is a diagram showing a state that the movable shaft of the hollow shaped molding device shown in FIG. 14 is moved backward.
Figure 16:
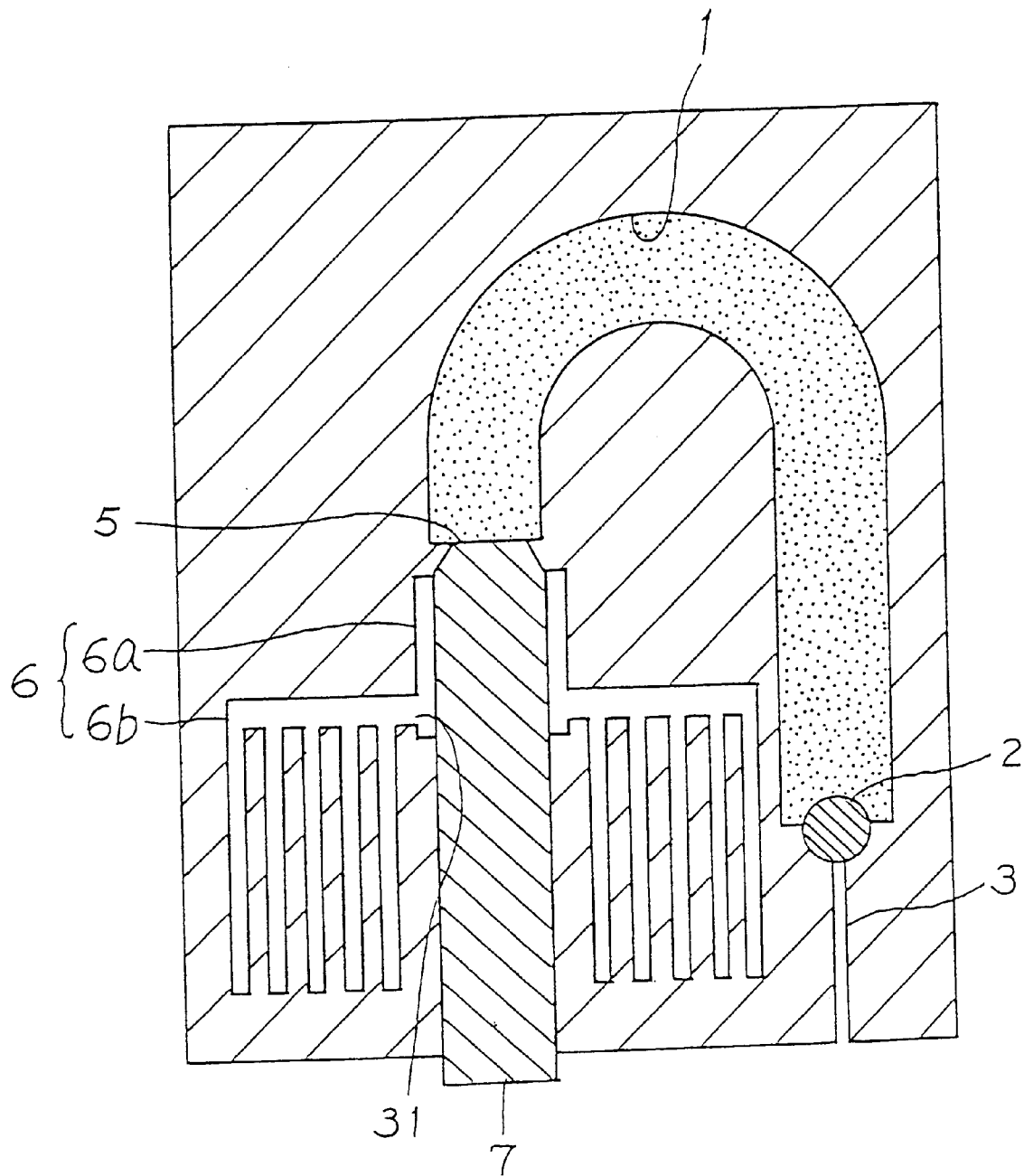
FIG. 16 is a diagram showing a state after the injection of the molten resin in the hollow shaped molding process according to the third aspect of the invention.
Figure 17:
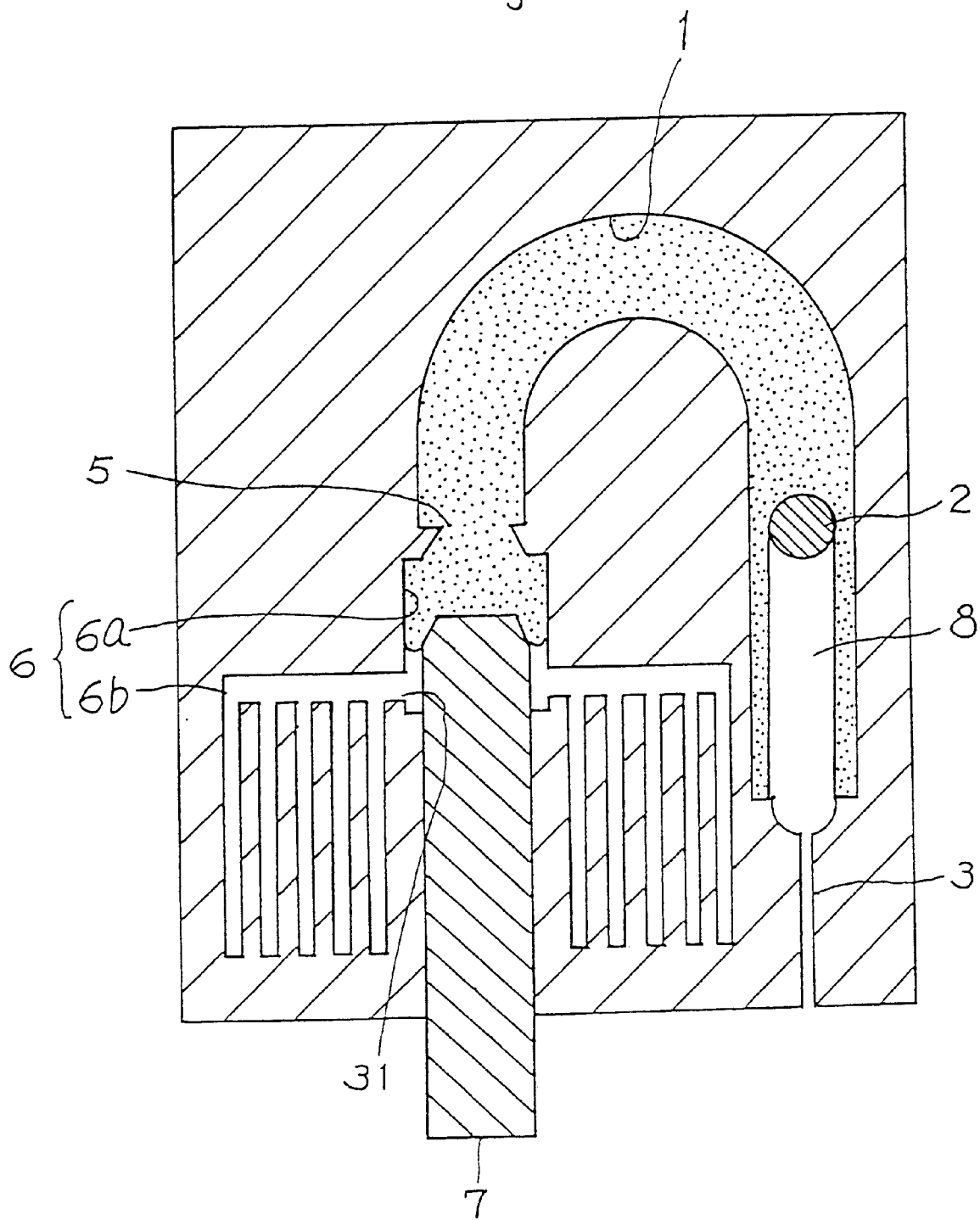
FIG. 17 is a diagram showing a process of injecting the compressed fluid in the hollow shaped molding process according to the third aspect of the invention.
Figure 18:
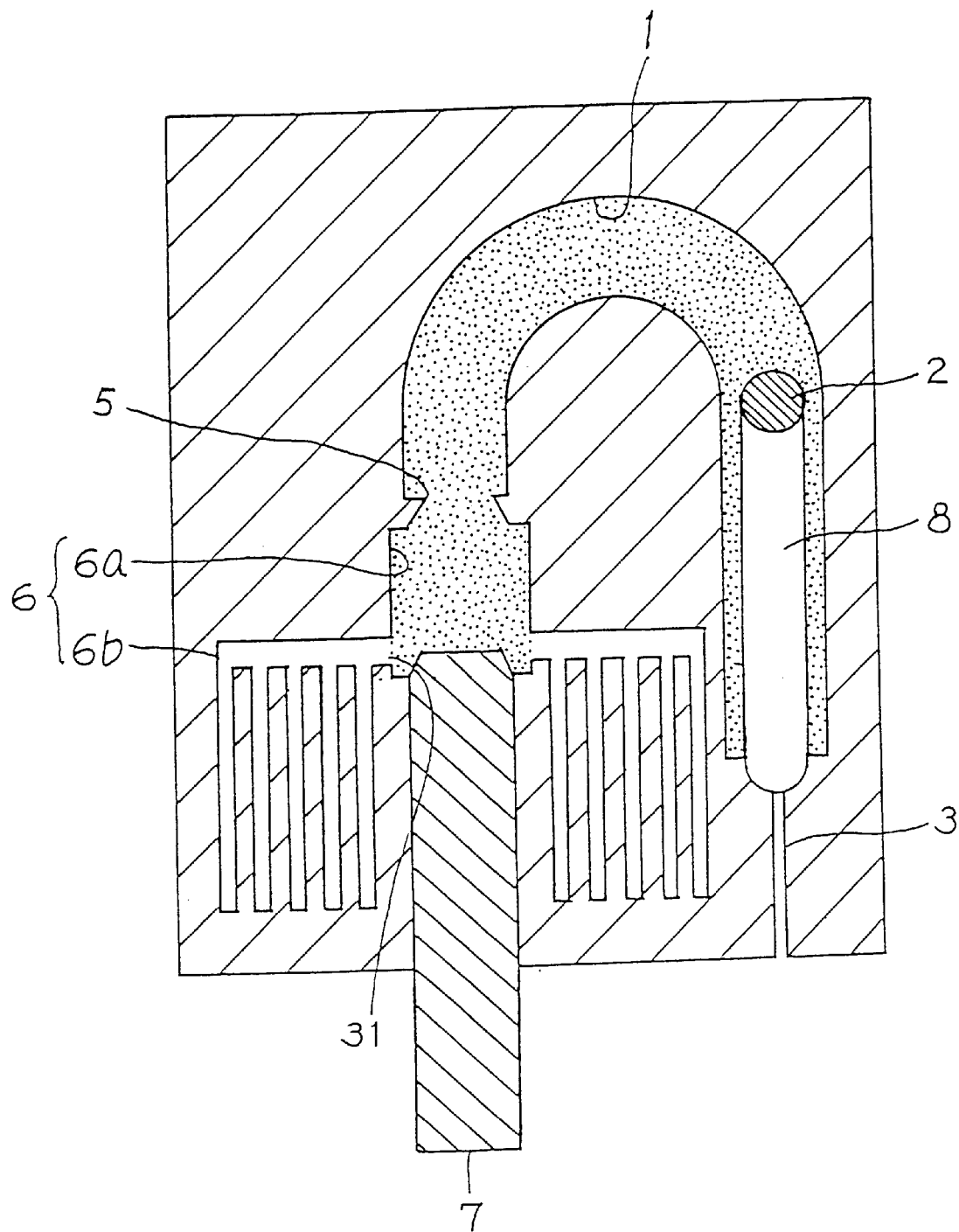
FIG. 18 is a diagram showing a process of injecting the compressed fluid in the hollow shaped molding process according to the third aspect of the invention.
Figure 19:
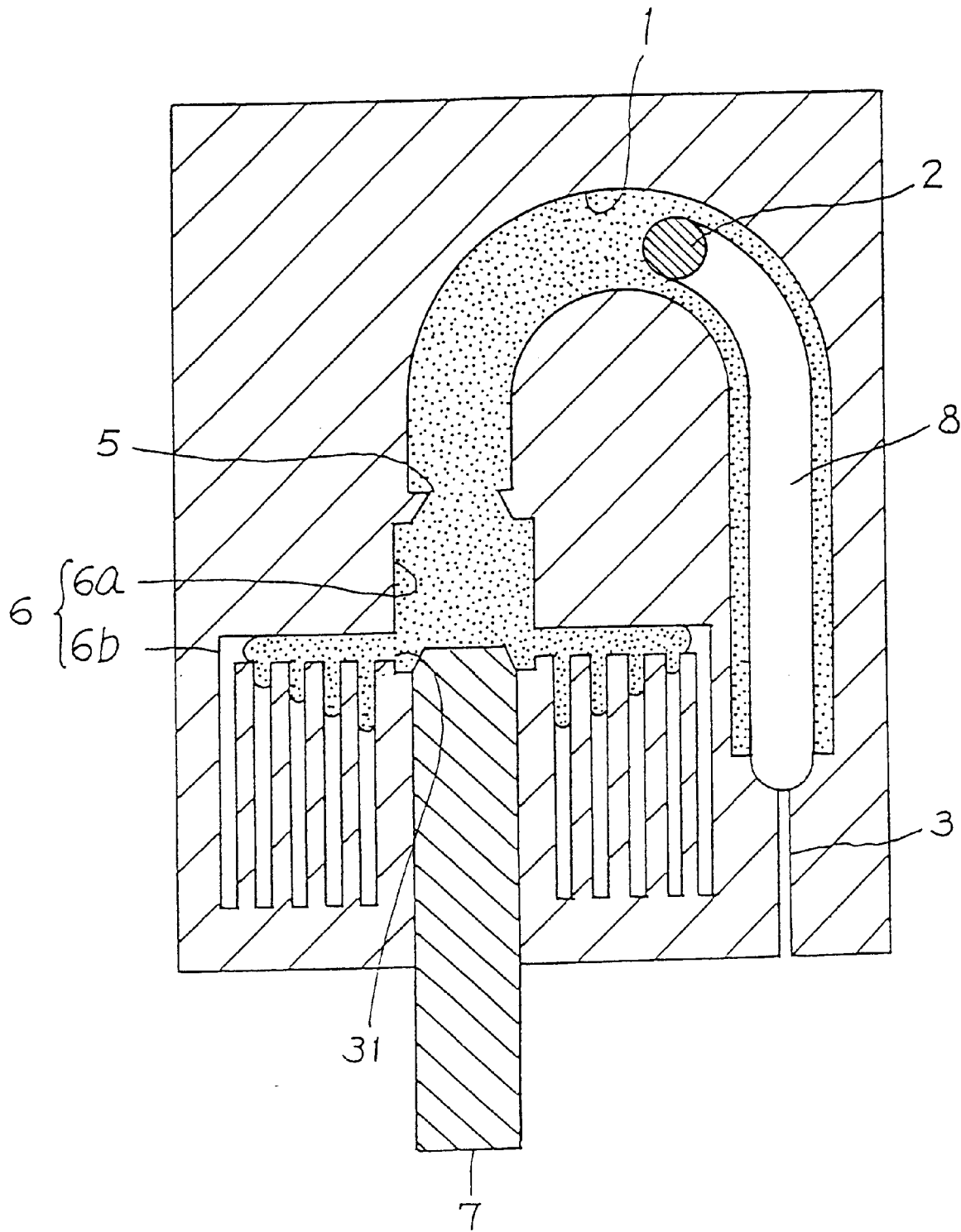
FIG. 19 is a diagram showing a state of injecting the compressed fluid in the hollow shaped molding process according to the third aspect of the invention.
Figure 20:
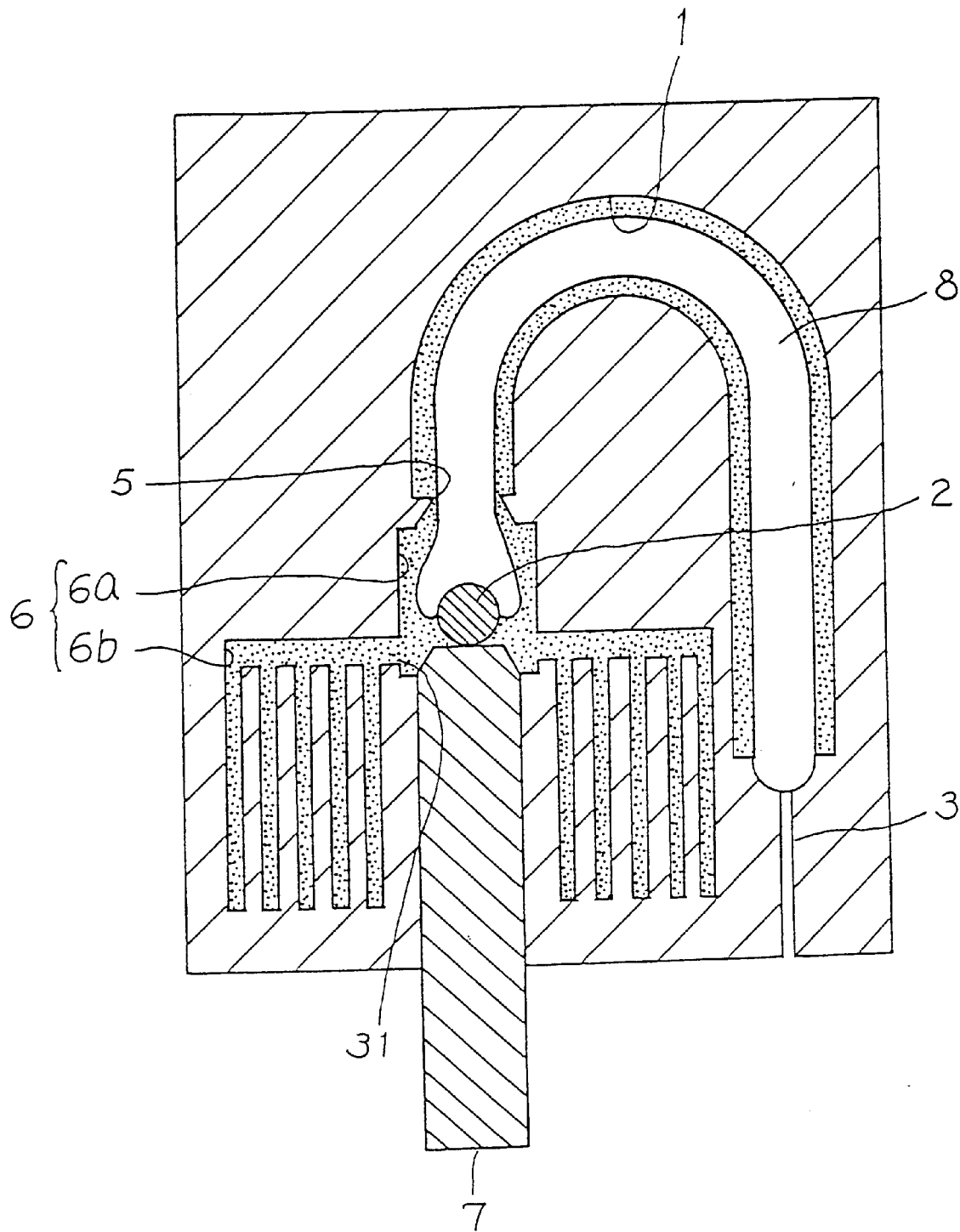
FIG. 20 is a diagram showing a state that the floating core has entered the sub-cavity by the injection of the compressed fluid in the hollow shaped molding process according to the third aspect of the invention.
Figure 21:
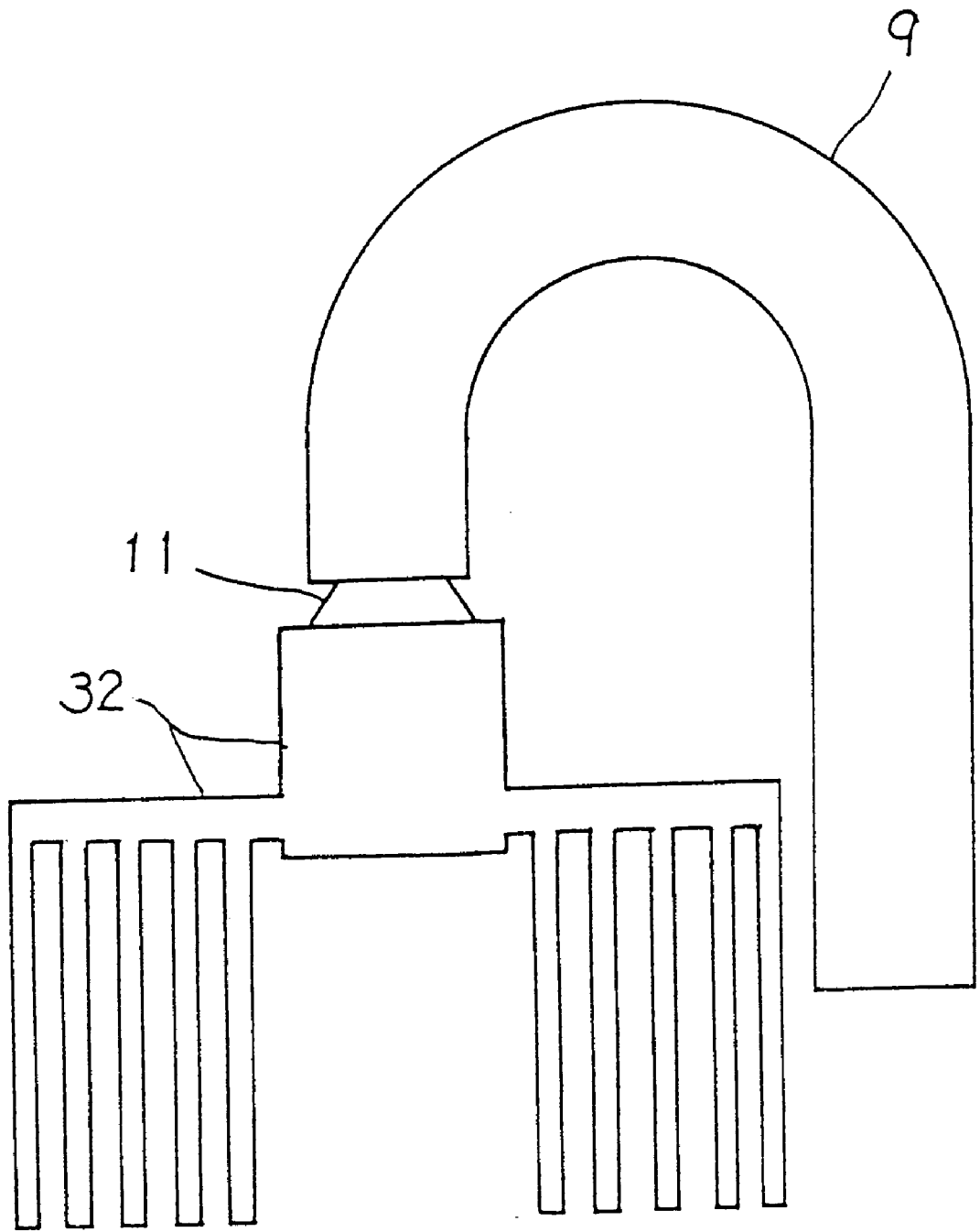
FIG. 21 is a diagram showing a molded article removed from the mold of the hollow shaped molding device shown in FIG. 15 according to the third aspect of the invention.

What is claimed is:

1. A process for producing a hollow shaped molded article, said process comprising the steps of:
    injecting a molten resin into a main cavity, wherein said main cavity has an injection port which is provided with a floating core at a first end of said main cavity and a sub-cavity at a second end of said main cavity through an openable communication port;
    injecting a compressed fluid from said injection port to move said floating core toward said communication port; and
    discharging said resin from said main cavity into said sub-cavity through said communication port, wherein said resin which is to be discharged into said sub-cavity is previously positioned along a center of said main cavity into said sub-cavity by being pushed by said floating core as said floating core is moving, and then moving said floating core into said sub-cavity through said communication port.

2. A process for producing said hollow shaped molded article, said process comprising the steps of:
    injecting a molten resin into a main cavity, wherein said main cavity has an injection port which is provided with a floating core at a first end of said main cavity and a sub-cavity at a second end of said main cavity through an openable communication port;
    injecting a compressed fluid from said injection port to move said floating core toward said communication port; and
    discharging said resin into said sub-cavity through said communication port, including:
        charging a reinforced resin into said main cavity along an inner wall of said main cavity;
        charging a non-reinforced resin along a center of said main cavity;
        moving said floating core to discharge said non-reinforced resin positioned along said center of said main cavity into said sub-cavity, while leaving said non-reinforced resin which forms an inner layer on an inner wall of said reinforced resin which forms said outer layer; and
        moving said floating core into said sub-cavity through said communication port.

3. A process for producing a hollow shaped molded article, said process comprising the steps of:
    injecting a molten resin into a main cavity, wherein said main cavity has an injection port which is provided with a floating core at a first end of said main cavity and a sub-cavity at a second end of said main cavity through an openable communication port;
    injecting a compressed fluid from said injection port to move said floating core toward said communication port; and
    discharging said resin into said sub-cavity through said communication port, including:
        moving said floating core into said sub-cavity through said communication port, while controlling a moving speed of said floating core after starting to move said floating core.

4. The process for producing a hollow shaped molded article according to claim 3, wherein said moving step includes said moving speed of said floating core being restrained by controlling a volume of said sub-cavity after starting to move said floating core.

5. The process for producing a hollow shaped molded article according to claim 4, wherein said moving step includes said volume of said sub-cavity, after starting to move said floating core, being controlled by controlling a shift of said movable shaft which can reciprocally move within said sub-cavity toward said communication port and can vary said volume of said sub-cavity.

6. The process for producing a hollow shaped molded article according to claim 3, wherein said moving step includes said moving speed of said floating core being restrained by increasing a flow resistance of said resin into said sub-cavity after starting to move said floating core.

7. The process for producing a hollow shaped molded article according to claim 6, wherein said moving step includes increasing said flow resistance such that said flow resistance, of said resin remaining in said sub-cavity, is increased after discharging said resin of between 2 to 10 times a volume of said floating core into said subcavity by moving said floating core.

8. The process for producing a hollow shaped molded article according to any one of claims 1 to 3, wherein said floating core is made of resin.

9. A device for producing a hollow shaped molded article, said device comprising:
    a main cavity having a floating core at a first end of said main cavity and an injection port for injecting a compressed fluid for moving said floating core to a second end of said main cavity; and
    an openable communication port which communicates with a sub-cavity and which is provided at said second end of said main cavity, wherein said communication port has a size large enough to allow said floating core to pass through, and said sub-cavity comprises a primary sub-cavity which communicates with said communication port and a secondary sub-cavity which communicates with said primary sub-cavity through a connection port, and said connection port has an open area smaller than an open area of said communication port.

10. The device for producing a hollow shaped molded article according to claim 9, wherein said secondary sub-cavity is branched into a plurality of any one of plate shapes and thin rod shapes.

11. The device for producing a hollow shaped molded article according to claim 10, wherein a flow cross-sectional ration of said primary sub-cavity is any one of equal to $\frac{1}{100}$, between $\frac{1}{100}$ and $\frac{1}{3}$, and equal to $\frac{1}{3}$.

12. The device for producing a hollow shaped molded article according to any one of claims 9 to 11, wherein said primary sub-cavity has a volume and said floating core has a volume such that said volume of said primary sub-cavity is any one of equal to 10 times said volume of said floating core, between 10 times said volume of said floating core and 2 times said volume of said floating core, and equal to 2 times said volume of said floating core.

13. The device for producing a hollow shaped molded article according to claim 9, wherein a movable shaft is provided within said sub-cavity to reciprocate with respect to said communication port.

14. The device for producing a hollow shaped molded article according to claim 13, wherein said movable shaft can close said communication port when moved forward.

* * * * *